(12) United States Patent
Inbar et al.

(10) Patent No.: US 9,880,760 B2
(45) Date of Patent: Jan. 30, 2018

(54) MANAGING DATA STORED IN A NONVOLATILE STORAGE DEVICE

(71) Applicant: SanDisk Technologies Inc., Plano, TX (US)

(72) Inventors: Karin Inbar, Ramat Hasharon (IL); Yossi Benner, Shoham (IL); Lola Grin, Netanya (IL); Einat Lev, Kfar-Saba (IL); Alexei Naberezhnov, Minsk (BY)

(73) Assignee: SanDisk Technologies LLC, Plano, TX (US)

( * ) Notice: Subject to any disclaimer, the term of this patent is extended or adjusted under 35 U.S.C. 154(b) by 52 days.

(21) Appl. No.: 14/928,897

(22) Filed: Oct. 30, 2015

(65) Prior Publication Data

US 2016/0124668 A1    May 5, 2016

Related U.S. Application Data

(60) Provisional application No. 62/072,879, filed on Oct. 30, 2014.

(51) Int. Cl.
*G06F 12/00* (2006.01)
*G06F 3/06* (2006.01)
*G06F 12/02* (2006.01)

(52) U.S. Cl.
CPC ............ *G06F 3/0619* (2013.01); *G06F 3/065* (2013.01); *G06F 3/068* (2013.01); *G06F 12/0246* (2013.01); *G06F 2212/7208* (2013.01); *G06F 2212/7209* (2013.01)

(58) Field of Classification Search
CPC .. G06F 12/00; G06F 3/06; G06F 3/065; G06F 3/067; G06F 3/0619
USPC ................................ 711/100, 103, 154, 200
See application file for complete search history.

(56) References Cited

U.S. PATENT DOCUMENTS

| | | | |
|---|---|---|---|
| 7,212,440 B2 | 5/2007 | Gorobets | |
| 8,601,347 B1* | 12/2013 | Koseki | G06F 11/1048 714/758 |
| 2004/0068627 A1* | 4/2004 | Sechrest | G06F 12/122 711/158 |
| 2014/0189209 A1* | 7/2014 | Sinclair | G06F 12/0246 711/103 |

* cited by examiner

*Primary Examiner* — Tuan Thai
(74) *Attorney, Agent, or Firm* — Brinks Gilson & Lione

(57) ABSTRACT

A storage device may be configured to copy valid data units from a source memory area to a destination memory area according to a source-to-destination mapping. The source-to-destination mapping may be generated based on a ranking scheme that considers the number of valid data units being stored in each of a plurality of source pages storing the data.

18 Claims, 20 Drawing Sheets

Validity Log

| Source Storage Pages | Data Units | | | | | | | | Initial Source Rank |
|---|---|---|---|---|---|---|---|---|---|
| 0  | U1   | U2   | U3   | U4   | U5   | U6   | U7   | U8   | 8 |
| 1  | U9   | U10  | U11  | U12  | U13  | U14  | U15  | U16  | 8 |
| 2  |      | U19  |      |      |      |      |      |      | 1 |
| 3  | U25  |      | U27  | U28  | U29  | U30  | U31  | U32  | 7 |
| 4  | U33  | U34  | U35  | U36  |      |      |      |      | 4 |
| 5  | U40  | U41  | U42  | U43  |      |      |      |      | 4 |
| 6  | U48  | U49  |      | U51  |      | U53  |      | U55  | 5 |
| 7  | U56  |      |      |      | U60  | U61  |      |      | 3 |
| 8  |      | U65  |      |      |      |      | U70  |      | 2 |
| 9  |      |      | U74  |      |      |      |      |      | 1 |
| 10 |      |      | U82  | U83  | U84  | U85  |      | U87  | 5 |
| 11 |      |      |      |      |      |      |      |      | 0 |
| 12 | U96  | U97  | U98  | U99  | U100 | U101 | U102 |      | 7 |
| 13 | U104 | U105 | U106 | U107 |      | U109 | U110 | U111 | 7 |
| 14 |      |      |      |      |      |      | U118 | U119 | 2 |
| 15 |      |      |      |      | U124 | U125 | U126 | U127 | 4 |
| 16 |      |      |      |      |      |      | U134 |      | 1 |
| 17 |      | U137 |      | U139 |      | U141 |      |      | 3 |

Plane 0      Plane 1

FIG. 4

Initial Source-to-Destination Mapping

| Dest. Storage Pages | Data Units | | | | | | | | Initial Dest. Rank |
|---|---|---|---|---|---|---|---|---|---|
| 0 | | | | | | | | | 8 |
| 1 | | | | | | | | | 8 |
| 2 | | | | | | | | | 8 |
| 3 | | | | | | | | | 8 |
| 4 | | | | | | | | | 8 |
| 5 | | | | | | | | | 8 |
| 6 | | | | | | | | | 8 |
| 7 | | | | | | | | | 8 |
| 8 | | | | | | | | | 8 |

Plane 0　　　　　Plane 1

FIG. 5

| Rank 8 | Rank 7 | Rank 6 | Rank 5 | Rank 4 | Rank 3 | Rank 2 | Rank 1 |
|---|---|---|---|---|---|---|---|
| SSP 0 | SSP 3 | | SSP 6 | SSP 4 | SSP 7 | SSP 8 | SSP 2 |
| SSP 1 | SSP 12 | | SSP 10 | SSP 5 | SSP 17 | SSP 14 | SSP 9 |
| | SSP 13 | | | SSP 15 | | | SSP 16 |

Initial Source Ranking Lists

FIG. 6

| Rank 8 | Rank 7 | Rank 6 | Rank 5 | Rank 4 | Rank 3 | Rank 2 | Rank 1 |
|---|---|---|---|---|---|---|---|
| DSP 0 → DSP 8 | | | | | | | |

Initial Destination Ranking Lists

FIG. 7

Updated Source-to-Destination Mapping After Initial Stage

| Dest. Storage Pages | FMUs | | | | | | | | Updated Dest. Rank |
|---|---|---|---|---|---|---|---|---|---|
| 0 | U1 0 | U2 0 | U3 0 | U4 0 | U5 0 | U6 0 | U7 0 | U8 0 | 0 |
| 1 | U9 0 | U10 0 | U11 0 | U12 0 | U13 0 | U14 0 | U15 0 | U16 0 | 0 |
| 2 | U25 0 | | U27 0 | U28 0 | U29 0 | U30 0 | U31 0 | U32 0 | 1 |
| 3 | U96 0 | U97 0 | U98 0 | U99 0 | U100 0 | U101 0 | U102 0 | | 1 |
| 4 | U104 0 | U105 0 | U106 0 | U107 0 | | U109 0 | U110 0 | U111 0 | 1 |
| 5 | U48 0 | U49 0 | | U51 0 | | U53 0 | | U55 0 | 3 |
| 6 | U82 0 | U83 0 | U84 0 | U85 0 | | U87 0 | | | 3 |
| 7 | U33 0 | U34 0 | U35 0 | U36 0 | | | | | 4 |
| 8 | U40 0 | U41 0 | U42 0 | U43 0 | | | | | 4 |

Plane 0　　　　　　　　　　　Plane 1

FIG. 8

| | Rank 1 | Rank 2 | Rank 3 | Rank 4 | Rank 5 | Rank 6 | Rank 7 | Rank 8 |
|---|---|---|---|---|---|---|---|---|
| | SSP 2 | SSP 8 | SSP 7 | SSP 15 | | | | |
| | SSP 9 | SSP 14 | SSP 17 | | | | | |
| | SSP 16 | | | | | | | |

Updated Source Ranking Lists

FIG. 9

| | Rank 1 | Rank 2 | Rank 3 | Rank 4 | Rank 5 | Rank 6 | Rank 7 | Rank 8 |
|---|---|---|---|---|---|---|---|---|
| | DSP 2 | | DSP 5 | DSP 7 | | | | |
| | DSP 3 | | DSP 6 | DSP 8 | | | | |
| | DSP 4 | | | | | | | |

Updated Destination Ranking Lists

FIG. 10

Updated Source-to-Destination Mapping After Second Stage

| Dest. Storage Pages | FMUs | | | | | | | | Updated Dest. Rank |
|---|---|---|---|---|---|---|---|---|---|
| 0 | U1 ⁰ | U2 ⁰ | U3 ⁰ | U4 ⁰ | U5 ⁰ | U6 ⁰ | U7 ⁰ | U8 ⁰ | 0 |
| 1 | U9 ⁰ | U10 ⁰ | U11 ⁰ | U12 ⁰ | U13 ⁰ | U14 ⁰ | U15 ⁰ | U16 ⁰ | 0 |
| 2 | U25 ⁰ | U19 ᶜ | U27 ⁰ | U28 ⁰ | U29 ⁰ | U30 ⁰ | U31 ⁰ | U32 ⁰ | 0 |
| 3 | U96 ⁰ | U97 ⁰ | U98 ⁰ | U99 ⁰ | U100 ⁰ | U101 ⁰ | U102 ⁰ | U74 ᶜ | 0 |
| 4 | U104 ⁰ | U105 ⁰ | U106 ⁰ | U107 ⁰ | U134 ᶜ | U109 ⁰ | U110 ⁰ | U111 ⁰ | 0 |
| 5 | U48 ⁰ | U49 ⁰ | U56 ᶜ | U51 ⁰ | U60 ᶜ | U53 ⁰ | U61 ᶜ | U55 ⁰ | 0 |
| 6 | U137 ⁰ | U139 ⁰ | U82 ⁰ | U83 ⁰ | U84 ᶜ | U85 ⁰ | U141 ᶜ | U87 ᶜ | 0 |
| 7 | U33 ⁰ | U34 ⁰ | U35 ⁰ | U36 ⁰ | U124 ᶜ | U125 ᶜ | U126 ᶜ | U27 ᶜ | 0 |
| 8 | U40 ⁰ | U41 ⁰ | U42 ⁰ | U43 ⁰ | | | | | 4 |

Plane 0      Plane 1

FIG. 11

Updated Source Ranking Lists

| Rank 8 | Rank 7 | Rank 6 | Rank 5 | Rank 4 | Rank 3 | Rank 2 | Rank 1 |
|---|---|---|---|---|---|---|---|
| | | | | | | SSP 8 | |
| | | | | | | SSP 14 | |

FIG. 12

Updated Destination Ranking Lists

| Rank 8 | Rank 7 | Rank 6 | Rank 5 | Rank 4 | Rank 3 | Rank 2 | Rank 1 |
|---|---|---|---|---|---|---|---|
| | | | | DSP 8 | | | |

FIG. 13

Updated Source-to-Destination Mapping
After Third Stage

| Dest. Storage Pages | FMUs | | | | | | | | Updated Dest. Rank |
|---|---|---|---|---|---|---|---|---|---|
| 0 | U1 ⁰ | U2 ⁰ | U3 ⁰ | U4 ⁰ | U5 ⁰ | U6 ⁰ | U7 ⁰ | U8 ⁰ | 0 |
| 1 | U9 ⁰ | U10 ⁰ | U11 ⁰ | U12 ⁰ | U13 ⁰ | U14 ⁰ | U15 ⁰ | U16 ⁰ | 0 |
| 2 | U25 ⁰ | U19 ᶜ | U27 ⁰ | U28 ⁰ | U29 ⁰ | U30 ⁰ | U31 ⁰ | U32 ⁰ | 0 |
| 3 | U96 ⁰ | U97 ⁰ | U98 ⁰ | U99 ⁰ | U100 ⁰ | U101 ⁰ | U102 ⁰ | U74 ᶜ | 0 |
| 4 | U104 ⁰ | U105 ⁰ | U106 ⁰ | U107 ⁰ | U134 ᶜ | U109 ⁰ | U110 ⁰ | U111 ⁰ | 0 |
| 5 | U48 ⁰ | U49 ⁰ | U56 ᶜ | U51 ⁰ | U60 ᶜ | U53 ⁰ | U61 ᶜ | U55 ⁰ | 0 |
| 6 | U137 ⁰ | U139 ⁰ | U82 ⁰ | U83 ⁰ | U84 ᶜ | U85 ⁰ | U141 ᶜ | U87 ᶜ | 0 |
| 7 | U33 ⁰ | U34 ⁰ | U35 ⁰ | U36 ⁰ | U124 ᶜ | U125 ᶜ | U126 ᶜ | U27 ᶜ | 0 |
| 8 | U40 ⁰ | U41 ⁰ | U42 ⁰ | U43 ⁰ | U65 ᶜ | U70 ᶜ | | | 2 |

Plane 0      Plane 1

FIG. 14

| Updated Source Ranking Lists | | | | | | | |
|---|---|---|---|---|---|---|---|
| Rank 8 | Rank 7 | Rank 6 | Rank 5 | Rank 4 | Rank 3 | Rank 2 | Rank 1 |
| | | | | | | SSP 14 | |

FIG. 15

| Updated Destination Ranking Lists | | | | | | | |
|---|---|---|---|---|---|---|---|
| Rank 8 | Rank 7 | Rank 6 | Rank 5 | Rank 4 | Rank 3 | Rank 2 | Rank 1 |
| | | | | | | DSP 8 | |

FIG. 16

Completed Source-to-Destination Mapping

| Dest. Storage Pages | FMUs | | | | | | | | Final Dest. Rank |
|---|---|---|---|---|---|---|---|---|---|
| 0 | U1 $^0$ | U2 $^0$ | U3 $^0$ | U4 $^0$ | U5 $^0$ | U6 $^0$ | U7 $^0$ | U8 $^0$ | 0 |
| 1 | U9 $^0$ | U10 $^0$ | U11 $^0$ | U12 $^0$ | U13 $^0$ | U14 $^0$ | U15 $^0$ | U16 $^0$ | 0 |
| 2 | U25 $^0$ | U19 $^C$ | U27 $^0$ | U28 $^0$ | U29 $^0$ | U30 $^0$ | U31 $^0$ | U32 $^0$ | 0 |
| 3 | U96 $^0$ | U97 $^0$ | U98 $^0$ | U99 $^0$ | U100 $^0$ | U101 $^0$ | U102 $^0$ | U74 $^C$ | 0 |
| 4 | U104 $^0$ | U105 $^0$ | U106 $^0$ | U107 $^C$ | U134 $^C$ | U109 $^0$ | U110 $^0$ | U111 $^0$ | 0 |
| 5 | U48 $^0$ | U49 $^0$ | U56 $^C$ | U51 $^0$ | U60 $^C$ | U53 $^0$ | U61 $^C$ | U55 $^0$ | 0 |
| 6 | U137 $^0$ | U139 $^0$ | U82 $^0$ | U83 $^0$ | U84 $^C$ | U85 $^0$ | U141 $^C$ | U87 $^C$ | 0 |
| 7 | U33 $^0$ | U34 $^0$ | U35 $^0$ | U36 $^0$ | U124 $^C$ | U125 $^C$ | U126 $^C$ | U127 $^C$ | 0 |
| 8 | U40 $^0$ | U41 $^0$ | U42 $^0$ | U43 $^0$ | U65 $^C$ | U70 $^C$ | U118 $^C$ | U119 $^C$ | 0 |

Plane 0　　　　　　　　　　Plane 1

FIG. 17

| Rank 8 | Rank 7 | Rank 6 | Rank 5 | Rank 4 | Rank 3 | Rank 2 | Rank 1 |
|---|---|---|---|---|---|---|---|
|  |  |  |  |  |  |  |  |

Updated Source Ranking Lists

FIG. 18

| Rank 8 | Rank 7 | Rank 6 | Rank 5 | Rank 4 | Rank 3 | Rank 2 | Rank 1 |
|---|---|---|---|---|---|---|---|
|  |  |  |  |  |  |  |  |

Updated Destination Ranking Lists

FIG. 19

Initial Source Ranking Lists Factoring In Planes

| Rank 8 | Rank 7 | Rank 6 | Rank 5 | Rank 4 | | | Rank 3 | | | Rank 2 | | |
|---|---|---|---|---|---|---|---|---|---|---|---|---|
| | | | | SP (0) | SP (1) | MP | SP (0) | SP (1) | MP | SP (0) | SP (1) | MP |
| SSP 0 | SSP 3 | | SSP 6 | SSP 4 (0) | SSP 15 (1) | | | | SSP 7 | | SSP 14 (1) | SSP 8 |
| SSP 1 | SSP 12 | | SSP 10 | SSP 5 (0) | | | | | SSP 17 | | | |
| | SSP 13 | | | | | | | | | | | |

| Rank 1 |
|---|
| SSP 2 |
| SSP 9 |
| SSP 16 |

Updated Source Ranking Lists Factoring In Planes Following Initial Mapping Stage

| Rank 8 | Rank 7 | Rank 6 | Rank 5 | Rank 4 | | | Rank 3 | | | | Rank 2 | | Rank 1 |
|---|---|---|---|---|---|---|---|---|---|---|---|---|---|
| | | | | SP (0) | SP (1) | MP | SP (0) | SP (1) | MP | | SP (1) | MP | |
| | | | | | SSP 15 (1) | | | | SSP 7 SSP 17 | | SSP 14 (1) | SSP 8 | SSP 2 SSP 9 SSP 16 |

FIG. 22

Updated Destination Ranking Lists Factoring In Planes Following Initial Mapping Stage

| Rank 8 | Rank 7 | | Rank 6 | | | Rank 5 | | | Rank 4 | | | Rank 3 | Rank 2 | Rank 1 |
|---|---|---|---|---|---|---|---|---|---|---|---|---|---|---|
| | SP (0) | SP (1) | MP | SP (0) | SP (1) | MP | SP (0) | SP (1) | MP | SP (1) | | | | |
| | | | | | | | | | | DSP 7 (1) DSP 8 (1) | | DSP 5 DSP 6 | | DSP 2 DSP 3 DSP 4 |

| Rank 8 | Rank 7 | Rank 6 | Rank 5 | Rank 4 | | | Rank 3 | | | Rank 2 | | Rank 1 |
|---|---|---|---|---|---|---|---|---|---|---|---|---|
| | | | | SP (0) | SP (1) | MP | SP (0) | SP (1) | MP | SP (0) | SP (1) | |
| | | | | | | | | | | | SSP 14 (1) | SSP 8 |

Updated Source Ranking Lists Factoring In Planes Following Second Mapping Stage

FIG. 23

| Rank 8 | | | Rank 7 | | | Rank 6 | | | Rank 5 | | | Rank 4 | | | Rank 3 | Rank 2 | Rank 1 |
|---|---|---|---|---|---|---|---|---|---|---|---|---|---|---|---|---|---|
| SP (0) | SP (1) | MP | SP (0) | SP (1) | MP | SP (0) | SP (1) | MP | SP (0) | SP (1) | MP | SP (0) | SP (1) | MP | | | |
| | | | | | | | | | | | | | DSP 8 (1) | | | | |

Updated Destination Ranking Lists Factoring In Planes Following Second Mapping Stage

FIG. 24

Completed Source-to-Destination Mapping

| Dest. Storage Pages | FMUs | | | | | | | | Final Dest. Rank |
|---|---|---|---|---|---|---|---|---|---|
| 0 | U1 $^0$ | U2 $^0$ | U3 $^0$ | U4 $^0$ | U5 $^0$ | U6 $^0$ | U7 $^0$ | U8 $^0$ | 0 |
| 1 | U9 $^0$ | U10 $^0$ | U11 $^0$ | U12 $^0$ | U13 $^0$ | U14 $^0$ | U15 $^0$ | U16 $^0$ | 0 |
| 2 | U25 $^0$ | U19 $^C$ | U27 $^0$ | U28 $^0$ | U29 $^0$ | U30 $^0$ | U31 $^0$ | U32 $^0$ | 0 |
| 3 | U96 $^0$ | U97 $^0$ | U98 $^0$ | U99 $^0$ | U100 $^0$ | U101 $^0$ | U102 $^0$ | U74 $^C$ | 0 |
| 4 | U104 $^0$ | U105 $^0$ | U106 $^0$ | U107 $^0$ | U134 $^C$ | U109 $^0$ | U110 $^0$ | U111 $^0$ | 0 |
| 5 | U48 $^0$ | U49 $^0$ | U56 $^C$ | U51 $^0$ | U60 $^C$ | U53 $^0$ | U61 $^C$ | U55 $^0$ | 0 |
| 6 | U137 $^0$ | U139 $^0$ | U82 $^0$ | U83 $^0$ | U84 $^C$ | U85 $^0$ | U141 $^C$ | U87 $^C$ | 0 |
| 7 | U33 $^0$ | U34 $^0$ | U35 $^0$ | U36 $^0$ | U124 $^0$ | U125 $^0$ | U126 $^0$ | U127 $^0$ | 0 |
| 8 | U40 $^0$ | U41 $^0$ | U42 $^0$ | U43 $^0$ | U65 $^C$ | U70 $^C$ | U118 $^0$ | U119 $^0$ | 0 |

Plane 0      Plane 1

FIG. 25

MANAGING DATA STORED IN A NONVOLATILE STORAGE DEVICE

CROSS-REFERENCE TO RELATED APPLICATIONS

This application claims the benefit of U.S. Provisional Application No. 62/072,879, filed Oct. 30, 2014. The contents of U.S. Provisional Application No. 62/072,879 are incorporated by reference in their entirety.

BACKGROUND

Storage modules include a memory having different areas with different bits-per-cell densities. In some situations, the storage module may determine to move data stored in a lower bit-per-cell density source area to a higher bit-per-cell density destination area of the memory. For some situations, some of the data stored in the source area may be obsolete or invalid. As such, when moving the data from the source area to the destination area, it may be desirable to move the valid data but not the invalid data. Additionally, storage modules may be capable of moving data using different copy operations. In one operation referred to as Copy Through Controller (CTC), a controller external to or "off chip" from the memory may be used to move the data. That is, data may be transferred from the memory to the controller and then back to the memory. In another operation referred to as On-chip copy (OCC) or copy-back, the copy of the data from the source area to the destination area is performed solely within the memory, i.e., without being transferred externally to the controller.

For some storage module, OCC may be desirable over CTC since OCC avoids an external data transfer. However, the ability of the storage module to use OCC instead of CTC may be limited. Additionally, when moving data, it is often desirable to minimize the amount of smaller portions of data that are moved to different destination areas, as doing so may lead to a larger number of partially obsolete areas, and in turn inefficiencies and premature aging of the memory. Accordingly, when moving data from a source area to a destination area, it may be desirable to generate a source-to-destination mapping that maximizes the number of OCC operations that the storage module may perform, while minimizing the number of times that certain source data is split and stored in separated portions of the destination area.

SUMMARY

Embodiments are defined by the claims, and nothing in this section should be taken as a limitation on those claims. By way of example, the embodiments described in this document and illustrated in the attached drawings generally relate to a storage device and related methods of copying valid data units from a source memory area to a destination memory area.

In one example, a storage device may include at least one memory comprising a source memory area and a destination memory area, wherein the source memory area comprises a plurality of source storage pages and the destination memory area comprises a plurality of destination storage pages. The storage device may further include control circuitry in communication with the at least one memory, where the control circuitry is configured to perform a copy operation to copies valid data units stored in the source memory area to the destination memory area. The control circuity may include a ranking module configured to assign one of a plurality of rankings to each of the plurality of source storage pages, where each ranking of the plurality of rankings indicates a number of valid data units stored in a respective one of the plurality of source storage pages. The control circuitry may further include a mapping generation module configured to generate a source-to-destination mapping for the copy operation, wherein the source-to-destination mapping maps the valid data units to the plurality of destination storage pages based on the assignment of the one of the plurality of rankings to each of the plurality of source storage pages.

In another example, a method of mapping data to destination locations for a copy operation may include: identifying, with control circuitry of a storage device, at least one first source storage page of a plurality of source storage pages as storing a largest number of valid data units among the plurality of source storage pages; and identifying, with the control circuitry, at least one second source storage page of the plurality of source storage pages as storing at least one but fewer than the largest number of valid data units. In addition, the method may include generating, with the control circuitry, a source-to-destination mapping that identifies a first group of valid data units to copy to a plurality of destination storage pages, wherein at least some of the valid data units in the first group are stored in the at least one first source storage page; and updating, with the control circuitry, the source-to-destination mapping to identify a second group of data units to copy to the plurality of destination storage pages, wherein the data units in the second group are stored in the at least one second source storage page. The method may further include copying, with the control circuitry, the first and second groups of valid data units from the plurality of source storage pages to the plurality of destination storage pages according to the source-to-destination mapping.

In sum, a storage device may copy valid data from a source memory area to a destination memory area in accordance with a ranking scheme that maximizes a number of on-chip copy operations to copy the valid data and that also minimizes the number of times data in a single source page is split to be copied to different destination pages, and/or the number of sense operations performed to copy the data.

These and other embodiments, features, aspects and advantages will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects and together with the description, serve to explain its principles. Wherever convenient, the same reference numbers will be used throughout the drawings to refer to the same or like elements.

FIG. 4 is schematic diagram of an example validity log.

FIG. 5 is a schematic diagram of an example source-to-destination mapping in an initial state.

FIG. 6 is a schematic diagram of an example set of source rankings lists initially populated with the example validity log of FIG. 4.

FIG. 7 is a schematic diagram of an example set of destination ranking lists initially populated.

FIG. 8 is a schematic diagram of the example source-to-destination mapping of FIG. 5 updated in response to performance of an initial mapping stage.

FIG. 9 is a schematic diagram of the example set of source ranking lists of FIG. 6 updated in response to performance of the initial mapping stage.

FIG. 10 is a schematic diagram of the example set of destination ranking lists of FIG. 7 updated in response to performance of an initial mapping stage.

FIG. 11 is a schematic diagram of the example source-to-destination mapping of FIG. 5 further updated in response to performance of a second mapping stage.

FIG. 12 is a schematic diagram of the example set of source ranking lists of FIG. 6 further updated in response to performance of the second mapping stage.

FIG. 13 is a schematic diagram of the example set of destination ranking lists of FIG. 7 further updated in response to performance of the second mapping stage.

FIG. 14 is a schematic diagram of the example source-to-destination mapping of FIG. 5 further updated in response to performance of a third mapping stage.

FIG. 15 is a schematic diagram of the example set of source ranking lists of FIG. 6 further updated in response to performance of the third mapping stage.

FIG. 16 is a schematic diagram of the example set of destination ranking lists of FIG. 7 further updated in response to performance of the third mapping stage.

FIG. 17 is a schematic diagram of the example source-to-destination mapping of FIG. 5 in a completed state.

FIG. 18 is a schematic diagram of the example set of source ranking lists of FIG. 6 further updated to show no more source entries to map.

FIG. 19 is a schematic diagram of the example set of destination ranking lists of FIG. 7 further updated to show no more destination entries to map.

FIG. 20 is a schematic diagram of another example set of source ranking lists that include single plane and multi-plane sections for some of the lists, where the source ranking lists are shown in initially using the validity log of FIG. 4.

FIG. 21 is a schematic diagram of the example set of source ranking lists of FIG. 20 updated after performance of the initial mapping stage FIG. 22 is a schematic diagram of an example set of destination ranking lists that include single plane and multi-plane sections for some of the lists, where the destination ranking lists are shown as updated after performance of the initial mapping stage.

FIG. 23 is a schematic diagram of the example set of source ranking lists of FIG. 20 further updated after the second mapping stage.

FIG. 24 is a schematic diagram of the example set of destination ranking lists of FIG. 22 further updated after the second mapping stage.

FIG. 25 is a schematic diagram of an example source-to-destination mapping in a completed state when factoring in planes while mapping.

DETAILED DESCRIPTION

Various modifications to and equivalents of the embodiments described and shown are possible and various generic principles defined herein may be applied to these and other embodiments. Thus, the claims are to be accorded the widest scope consistent with the principles, features, and teachings disclosed herein.

The present description describes a storage device, apparatus, or memory system (including non-volatile memory systems) that includes a controller or control circuitry configured to copy valid data units from a source memory area to a destination memory area. The copy operation may be performed according to a source-to-destination mapping that is generated based on a ranking scheme that considers the number of valid data units stored in each of a plurality of source storage pages of the source memory area storing the valid data units. The source-to-destination mapping may maximize a number of on-chip copy operations to copy the valid data and that also minimizes the number of times data in a single source page is split in order to be copied to different destination pages, and/or that minimizes the number of sense operations performed to copy the data.

Figure 1:
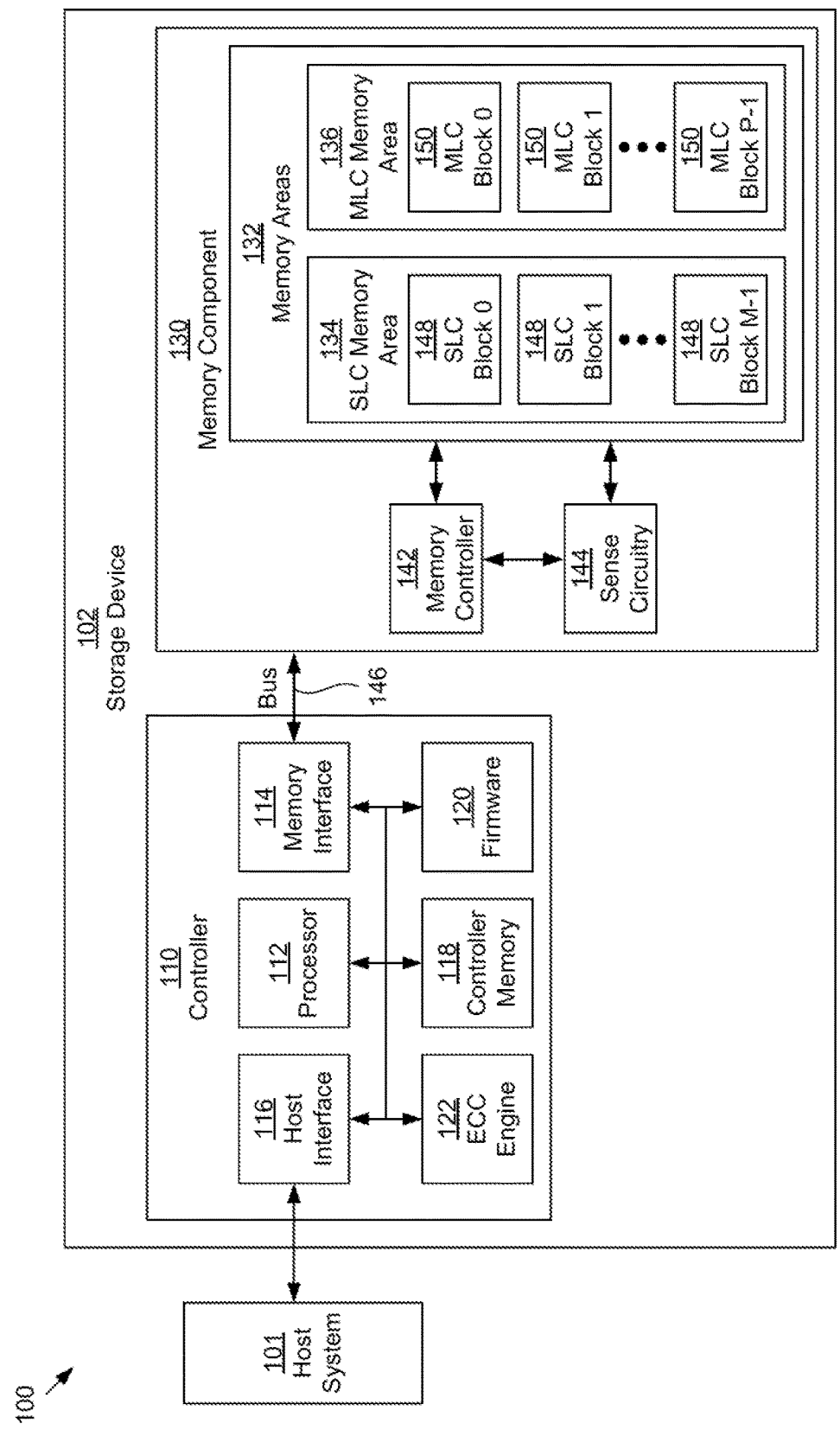
FIG. 1 is a block diagram of an example storage device.

FIG. 1 shows a block diagram of an example system 100 that includes a host system 101 and a storage device 102. The host system 101 may be configured to store data into and retrieve data from the storage device 102. The storage device 102 may be configured to perform memory management functions that control and manage the storage and retrieval of the data. As shown in FIG. 1, the storage device 102 may include a controller or control circuitry 110, a memory component 130, and a communications bus 146. Depending on the configuration of the storage device 102, the controller 110 and the memory component 130 may be on the same or different substrates. The communications bus 146 may provide a communications link between the controller 110 and the memory component 130. The communications bus 146 may be used by the controller 110 and the memory component 130 to communicate data, commands, or other information or messages in order to perform the memory management functions.

The controller 110 may include a processor or processor circuit 112 that is configured to perform and/or control the performance of at least some of the memory management functions. The processor 112 may include a single processor or a plurality of processors configured to perform various types of processing, such as co-processing, multi-processing, multi-tasking, parallel processing, remote processing, distributed processing, or the like, in order to perform the memory management functions. The processor 112 may be a microprocessor, a microcontroller, an application specific integrated circuit (ASIC), a field programmable gate array, a logic circuit (including an analog or digital logic circuit or combinations thereof), other now known or later developed circuitry having logical processing capability, or combinations thereof. In addition or alternatively, the processor 112 may be configured to execute program instructions that may be part of software, micro-code, firmware, stored in hardware, or the like in order to perform at least some of the memory management functions.

In addition, the controller 110 may also include a memory interface 114 that interfaces with the memory component 130. The controller 110 may also include a host interface 116 that configures the storage device 102 operatively in communication with the host system 101. As used herein, the phrase "operatively in communication with" could mean directly in communication with or indirectly in communication with through one or more components, which may or may not be shown or described herein. The processor 112, through or using the host interface 116, may receive host requests, such as host read and write requests, from the host system 101, and send, through or using the host interface 116, responses to the host read and write requests to the host system 101. Additionally, the host interface 116 may take any suitable form, such as, but not limited to, an eMMC host interface, a UFS interface, and a USB interface, as examples.

Also, some configurations of the controller 110 may include controller memory 118, which may be separate or "off-chip" from memory 132 in the memory component 130, and which may include one or more various types of memory structures or technologies of volatile memory, non-volatile memory, or combinations thereof. The processor 112 may use or access the controller memory 118 to perform its associated memory management functions. For example, software and/or firmware including program instructions may be stored in the controller memory 118, which the processor 112 may execute to perform one or more memory management functions. In addition or alternatively, data may be temporarily stored in the controller memory 118 before being stored in the memory component 130 or sent to the host system 101.

The controller 110 may also include firmware 120. The firmware 120 may include software and/or a set of executable program instructions, which may be stored in the controller memory 118 and/or which the processor 112 may execute or use to perform one or more of the memory management functions.

In addition, the controller 110 may include an error correction code (ECC) engine 122 that that may be configured to compensate for bits that may spontaneously fail during normal device operation to ensure data integrity. The ECC 122 may include or be configured to operate in accordance with one or more algorithms. In addition, the ECC 122 may be implemented in hardware, software, or a combination thereof. For example, the ECC 122 may be implemented in hardware logic and/or have its own built-in processor dedicated to performing ECC functions. In addition or alternatively, the ECC 122 may include software, which may be stored in the controller memory 118 and/or which the processor 122 may execute or use to perform all or some of the ECC functions.

The memory component 130 may include memory 132 configured to store data or other information in the storage device 102. In addition, the memory component 130 may include a memory controller or memory control circuitry 142 configured to control and/or manage the storage of data in the memory 132. The memory controller 142 may be configured to perform various memory management functions to control and/or manage the data storage, including, but not limited to, addressing, data transfer, sensing, row and column decoding, and/or gate biasing. In addition, the memory controller 142 may provide an interface between the controller 110 and the memory 132, such that the memory controller 142 may control and/or manage the storage of data in the memory 132 in response and/or according to context instructions or commands, such as sense, program, and/or erase commands, received from and/or generated by the controller 110. Additionally, the memory controller 142 may be implemented in hardware or a combination of hardware and software, and include one or more processors, logic circuits, buffers, voltage generators, and/or other circuitry to perform the functions of the memory controller 142.

The memory component 130 may further include sense circuitry 144, which may include sense amplifiers configured to sense data stored in the memory 132 and latches or page buffers configured to store the sensed data. Sensed data may then be transferred to a different portion of the memory 132 without being transferred to the controller 110, or alternatively may be transferred to the controller 110, such as to a RAM portion of the controller memory 118 via the communications bus 146.

Further, FIG. 1 shows the controller 110 and the memory controller 142 as separate components of the storage device 102. The controller 110 may be "off chip" from the memory 132, whereas the memory controller 142 may be "on chip" with the memory 132. However, for other example configurations, the memory controller 142 and/or the functions performed by the memory controller 142 may be incorporated into the controller 110, and the controller 110 may be configured to communicate directly with the memory 132 and/or the sense circuitry 144. Such other example configurations may be implemented where the controller 110 and the memory component 130 are part of the same substrate.

The memory 132 may include volatile memory, non-volatile memory, or combinations thereof. In addition or alternatively, the memory 132 may include a single type of memory (such as a single type of volatile memory or a single type of non-volatile memory) or different types of memory (such as different types of volatile memory, different types of non-volatile memory, or combinations thereof). An example type non-volatile memory may be flash memory, such as NAND flash memory, although other types of memory, including non-volatile and/or volatile memory types, may be possible.

In addition, the memory 132 may be a single physical space (such as a single die or a single chip) in which the controller 110 may use the same channel of the communications bus 146 to access the single physical space. Alternatively, the memory 132 may include multiple, different physical spaces (such as multiple dies or multiple chips) in which the controller 110 may use different channels of the communications bus 146 to access the different physical spaces.

In addition, the memory 132 may include a plurality of memory elements or cells, each configured to store one or more bits of data. In particular, the memory elements may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Whether a memory element is a SLC or a MLC may depend on the number of bits programmed or written into the memory element and/or the number of bits the memory element is storing. For example, if a memory element is storing a single bit of data, then the memory element may be configured as a SLC. Alternatively, if a memory element is storing multiple (two or more) bits of data, then the memory element may be configured as a MLC. Accordingly, each of the memory elements may be configured or programmed in a SLC mode or a MLC mode, as determined by how many bits each of the memory elements is storing. Further, for some example configurations, the mode in which each of the memory elements is configured may be dynamic. For example, a memory element may be programmed as a SLC and subsequently programmed as a MLC, or vice versa. For other example configurations, the modes may be static, in that a mode in which a memory element is configured or programmed may not change.

As shown in FIG. 1, the memory 132 may be separated into a SLC memory area 134 and a MLC memory area 136. The memory elements in the SLC memory area 134 may be configured as SLC memory elements, and the memory elements in the MLC memory area 136 may be configured as MLC memory elements. The SLC memory area 134 and the MLC memory area 136 may be part of the same physical space or located on different physical spaces.

In addition, the memory 132 may have an organizational arrangement or hierarchy under which the memory elements or cells of the memory 132 may be organized. The controller 110 may be configured to store data and/or access stored data in accordance with the organizational arrangement or hierarchy.

For some example configurations of flash memory, the memory elements may be divided or organized into blocks, with each block containing the minimum number of memory elements that may be erased together. Each block may be further divided into a number of pages, with each page being a unit of programming or reading. Each individual page may further be divided into segments or units (also sometimes referred to as flash memory units (FMUs), with each segment or unit containing the fewest number of memory elements that may be written to at one time as a basic programming operation. For some example configurations, the pages may be divided into the same number of segments or units. Example numbers may be four or eight, although other numbers may be possible. Hereafter, for merely simplicity and exemplary purposes, and unless otherwise specified, each page is assumed to be divided into eight segments or units.

Data that is stored in the flash memory may be referred to as being stored as one or more blocks of data, one or more pages of data, and/or one or more units of data. Accordingly, a block, page, or unit of SLCs may store a single block, a single page, or a single unit of data, respectively. A block, page, or unit of MLCs may store two or more blocks, two or more pages, or two or more units of data, respectively, depending on how many bits each of the MLCs store. As used herein, the physical memory elements that store data may be referred to as storage blocks, storage pages, and storage units, and the data itself may be referred to as data blocks, data pages, and data units. Storage blocks may store data blocks, storage pages may store data pages, and storage units may store data units.

Additionally, for some example configurations, multiple storage blocks and storage pages may be distributed across multiple arrays or planes and operated together as metablocks and metapages, respectively. Alternatively, the distribution of storage blocks and storage pages may be confined to a single array or plane. Data may be stored in a storage block and/or a storage metablock in various ways, including non-contiguously (randomly) or contiguously. As used herein, and unless otherwise specified, the terms "block" and "metablock" and the terms "page" and "metapage" may be used interchangeably and/or referred to collectively as "metablock" and "metapage" respectively, without concern for whether the block/metablock and page/metapage span a single array or plane or multiple arrays or planes.

For example configurations where the memory 132 comprises flash memory, each memory element may be a floating gate transistor (FGT) that has a floating gate and a control gate. The floating gate may be surrounded by an insulator or insulating material that helps retain charge in the floating gate. The presence or absence of charges inside the floating gate may cause a shift in a threshold voltage of the FGT, which may be used to distinguish logic levels. That is, each FGT's threshold voltage may be indicative of the data stored in the memory cell. Hereafter, FGT, memory element or memory cell may refer to the same physical entity and/or may be used interchangeably.

The memory cells may be disposed in the NAND-type flash memory array 132 in accordance with a matrix-like structure of rows and columns of memory cells. At the intersection of a row and a column may be a FGT (or memory cell). A column of FGTs may be referred to as a string. FGTs in a string or column may be electrically connected in series. A row of FGTs may be referred to as a page. Control gates of FGTs in a page or row may be electrically connected together.

The memory 132 may also include wordlines and bitlines connected to the FGTs. Each page of FGTs may be coupled to a corresponding wordline. In particular, each wordline may be coupled to the control gates of FGTs in a page. In addition, each string of FGTs may be coupled to a corresponding bitline. That is, each bitline may be coupled to a string of FGTs. Further, multiple wordlines may span across a single string, and the number of FGTs in a string may be equal to the number of pages in a block.

Figure 2:
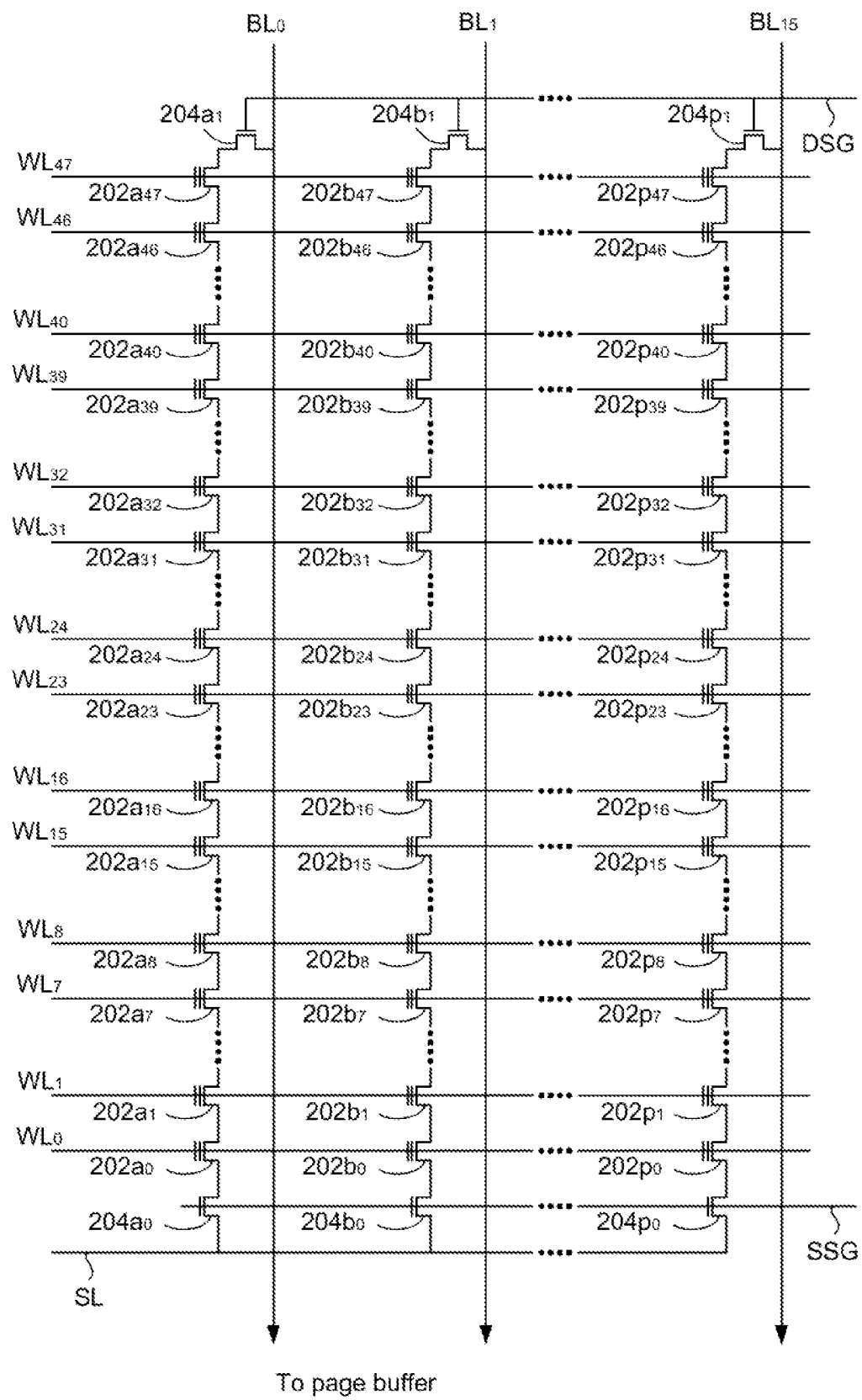
FIG. 2 is a circuit schematic diagram of a portion of a memory block.

FIG. 2 shows a circuit schematic diagram of a portion of a NAND-type flash memory 132. The portion shown in FIG. 2 includes a plurality of strings of forty-eight FGTs connected in series, including a first string of FGTs $202a_0$ to $202a_{47}$ and a second string of FGTs $202b_0$ to $202b_{47}$ extending to a sixteenth string of FGTs $202p_0$ to $202p_{47}$. A complete block may include many more strings than sixteen. In addition, numbers other than forty-eight FGTs per string and/or forty-eight wordlines may alternatively be used.

For the portion shown in FIG. 2, the first string is coupled to a first bitline $BL_0$. The second string is coupled to a second bitline $BL_1$, and the sixteenth string is coupled to a sixteenth bitline $BL_{15}$. Additionally, the portion shown in FIG. 2 includes forty-eight wordlines $WL_0$ to $WL_{47}$ coupled to forty-eight pages of FGTs—wordline $WL_0$ is coupled to control gates of FGTs in a first page comprising FGT $202a_0$, $202b_0, \ldots, 202p_0$; wordline $WL_1$ is coupled to control gates of FGTs in a second page comprising FGT $202a_1$, $202b_1, \ldots, 202p_1$; and so on.

To perform sense portion of a read or copy operation, a page of FGTs and a corresponding wordline may be selected, and current sensing of bitlines may be employed to determine whether a floating gate of a FGT in the selected page contains charge or not. Current flowing through a string may flow from a source line SL, through the string, to the bitline BL to which the string is coupled. The string may be coupled to the source line SL via a source select transistor and may be coupled to its associated bitline BL via a drain select transistor. For example, as shown in FIG. 2, the first string of FGTs $202a_0$ to $202a_{63}$ may be coupled to the source line SL via a source select transistor $204a_0$ that is connected to the source line SL and a first end FGT $202a_0$ of the first string. The other strings may be similarly coupled. Further, switching of the source select transistors $204a_0$, $204b_0, \ldots, 204p_0$ may be controlled using a source select gate bias line SSG that supplies a source select gate bias voltage $V_{SSG}$ to turn on an off the source select transistors $204a_0, 204b_0, \ldots, 204p_0$. Additionally, switching of the drain select transistors $204a_1, 204b_1, \ldots, 204p_1$ may be controlled using a drain select gate bias line DSG that supplies a drain select gate bias voltage $V_{DSG}$ to turn on and off the drain select transistors $204a_1, 204b_1, \ldots, 204p_1$.

Referring back to FIG. 1, the SLC memory area 134 may include SLC memory elements arranged into an M-number of SLC blocks 0 to (M−1), where M is one or greater. Similarly, the SLC memory area 136 may include a P-number of MLC blocks 0 to (P−1), where P is one or greater.

For some situations, data stored in one or more of the SLC blocks 148 may be moved or copied to one or more of the MLC blocks 150. As an example, where an MLC block 150 stores three bits per cell, data stored in three SLC blocks 148 may be copied to a single MLC block 150, where the data is stored in upper, middle, and lower pages of the MLC block 150. The moving or copying of data from the SLC memory area 134 to the MLC memory area 136 (or from one or more SLC blocks 148 to one or more MLC blocks 150) may be referred to as a folding operation. During a folding operation, the SLC blocks 148 storing the data to be copied may be referred to as source blocks or source SLC blocks, and the MLC blocks 150 into which the data may be copied may be referred to as destination blocks or destination MLC blocks. Similarly, the pages or units of storage storing the data in the SLC blocks 148 may be referred to as source storage pages or units, respectively, and the pages or units of storage in the MLC blocks 150 to which the data is to be stored may be referred to as destination storage pages or units, respectively.

For some situations, a folding operation may be performed as a second step to programming data into an MLC block 150. That is, while programming data directly from a RAM portion of the controller memory 118 to a MLC block 150 may be performed, such direct programming may be time consuming, take up a lot of space in the RAM portion of the controller memory 118, or otherwise be relatively inefficient. Rather than directly programming the data into the MLC memory area 136, the data may first be programmed from the RAM portion of the controller memory 118 to the SLC memory area 134. Subsequently, the data stored in the SLC memory area 134 may be moved or copied to the MLC memory area 134.

The storage device 102 may be configured to move and/or configured to decide or determine whether to the data with or without using the controller 110. In one operation referred to as Copy Through Controller (CTC), data that is sensed into the sense circuitry 144 may be transferred from the memory the SLC memory area 134 over the bus 146 to the to the controller 110, and then from the controller 110 and then back over the bus 146 to the MLC memory area 136. In another operation referred to as On-chip copy (OCC) or copy-back, data that is sensed into the sense circuitry 144 from the SLC memory area 134 may be sent directly to the MLC memory area 136 without being transferred to the controller 110.

Whether OCC or CTC is used to move data may depend on where the data is stored in the SLC memory area 134 and where in the MLC memory area 136 the data is to be stored. For example, data to be copied to a single destination storage page may be copied using OCC when all of the data to be copied is stored in the same source page. For example, a page of data may be copied to a single destination storage page using OCC when the page of data is stored in a single or the same source storage page. Alternatively, at least some of the data to be copied to a single destination storage page may be copied using CTC when the data is stored in multiple or different source storage pages. To illustrate, suppose five valid data units stored in a first source storage page and three valid data units stored in a second source storage page are to be copied to the same destination storage page. Valid data units in one of the source storage pages (e.g., the five valid data units in the first source storage page) may be copied to the destination storage page using OCC, and valid data units in the other of the source storage pages (e.g., the three valid data units in the second source storage page) may be copied to the destination storage page using CTC. In a particular implementation, the three valid data units in the second source storage page may be sensed to latches in the sense circuitry 144 and then transferred to the controller 110 in accordance with CTC. Additionally, the five valid data units along with the three invalid data units in the first source storage page may be sensed to latches in the sense circuitry 144 but not transferred to the controller 110 in accordance with OCC. With the three valid data units of the second source storage page may be then be sent to the latches to override the three invalid data units, and the combination of the five valid data units from the first source storage page and the three valid data units from the second source storage page may be copied to the destination storage page. In order to perform the copy, since the three valid data units from the second source storage page were sent to the controller 110 but the five valid data units were not, the three valid data units may be considered to have been copied using CTC, whereas the five valid data units may be considered to have been copied using OCC.

For some example configurations, an exception to the above may occur when the planes in which the data is stored are taken into consideration. In particular, data stored in the same source storage page but in different planes may be sensed separately or independently. Further, when OCC is performed, data stored in a source storage page in one plane may be sensed and copied to the same plane. As such, data from different source storage pages and also in different planes may all be copied to the same destination storage page using OCC, whereas data from different source storage pages but in the same or overlapping planes, may at least be partially copied using CTC. To illustrate, suppose four valid data units are stored in a first source storage page and all four of them are stored in a first plane. In addition, suppose another four valid data units are stored in a second source storage page and all four of them are stored in a second plane. Even though the two sets of four valid data units are stored in two different source storage pages, all eight of them may be copied using OCC because the two sets are completely stored in different planes. Accordingly, using OCC, the first set of four valid data units stored in the first plane may be copied to a portion of the destination storage page spanning the first plane, and the second set of four valid data units stored in the second plane may be copied to a portion of the destination storage page spanning the second plane.

Data stored in the memory 132 may have one of two states, either valid or invalid (also referred to as obsolete). In certain embodiments, data is valid if it is the most recent and applicable version or copy of the data (i.e., there is not a more recent version or copy located somewhere else in the memory 132). On the other hand, invalid or obsolete data is not the most recent version or copy. The data stored in different locations of a storage media or memory can change from being valid to invalid based on a number of factors and influences. The format or protocol for how a storage device or controller manages the data can change its state from valid to invalid. For example, in certain non-volatile memory storage devices data in a memory cell can not be changed from a first binary value to a second binary value without first being erased. In such memory devices, it is common practice to write changes to data in a new location and record that the data stored in a first location is now invalid and the data in the new location is valid. The invalidation of previously stored data, by subsequently stored revised versions of the data can be done by a storage controller, a host controller, a software file system, and software application, or in response to a user indication. For example, in some situations, data may become invalid when a user makes a change or an update to a file, and the change or update is handled in the memory 132 by data representing the change, or update, being generated and stored in a different memory location, while the data representing the older, prior version may be still be stored but is identified as being obsolete. In other situations, data may be identified as being unreliable or bad, such as due to the ECC engine identifying an uncorrectable error, or a number of program-erase cycles reaching a threshold, as non-limiting examples. To improve the reliability of the data, a storage management module may generate a copy of the data, optionally recovering erroneous data, (despite there not necessarily being an associated file change or update on a user level) and store the copied data in a different location, and the prior unreliable or bad data may remain on the media and be identified as invalid or obsolete. In another situation, an archiving or versioning system may identify certain versions of files as being old versions and the controller 110 may correspondingly identify data associated with the files as invalid rather than as valid. Various ways of identifying data as being valid and invalid (or obsolete) may be possible. When moving data from the SLC area 134 to the MLC area 136, it may be desirable to move the valid data and not the invalid data.

Before moving or copying the data from one or more source SLC blocks 148 to a destination MLC block 150, a scan of an address data structure that tracks addressing of the data may be performed to identify which of the data in the source SLC blocks 148 is valid and which is invalid. The determination may be made on a unit basis. That is, each data unit in the source SLC blocks 148 may be identified as either valid or invalid. Subsequently, a source-to-destination mapping (otherwise referred to as a folding vector) may be generated that identifies where each of the data units are to be stored in the destination MLC block 150. After and/or concurrent with generation of the source-to-destination mapping, the data may be moved or copied to the destination MLC block 150 using OCC, CTC, or a combination thereof. The source-to-destination mapping may be generated such that the number of OCC operations may be maximized and the number of sensing operations performed to read the valid data may be minimized.

Figure 3:
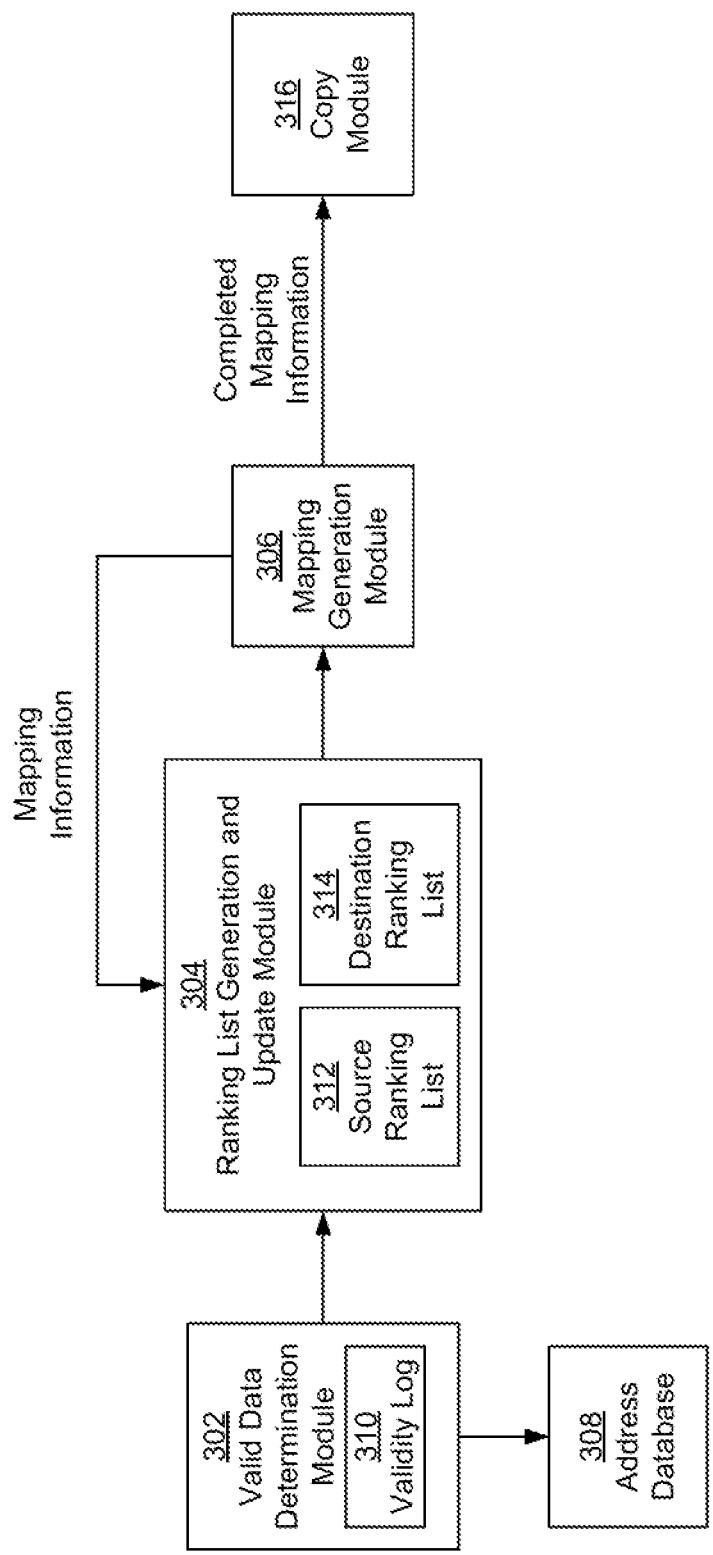
FIG. 3 is a block diagram of a plurality of modules associated with generation of a source-to-destination mapping.

FIG. 3 shows a block diagram of a plurality of modules associated with generation of a source-to-destination mapping for a copy or folding operation in which valid data stored in one or more source SLC blocks 148 is to be copied to a destination MLC block 150. The plurality of modules may include a valid data determination module 302, a ranking list generation and update module 304, and a mapping generation module 306.

The valid data determination module 302 may be configured to determine which of the data units in the source SLC blocks 148 is valid and invalid. For some example configurations, to do so, the valid data determination module 302 may be configured to access an address database 308, which may be stored in the memory 132, the controller memory 118, external to the storage device 102, or combinations thereof. The address database 308 may identify where the most recent versions of the data units are located in the memory 132. Various configurations of the address database 308 may be possible. For example, the address database 308 may include a single table (or other type of address data structure), or a plurality of tables, such as a main table and a one or more secondary tables that track where units of data are stored, including locations of the most recent versions of the data units and/or updates or changes to the locations of the data units. In addition, the address database 308 may provide mappings of logical address information and physical address information. Logical addresses may be associated with an addressing scheme maintained and/or managed by the host system 101 (FIG. 1). Physical addresses may identify the physical location in the memory 132 where the data is stored.

Each data unit may have associated logical address information, which may include a logical group number and an offset. When the valid data determination module 302 analyzes the data in the source SLC blocks 148, the valid data determination module 302 may identify the logical and/or physical addresses for the data use that information when accessing the address database 312 to determine whether a page is valid or invalid.

If the valid data determination module 302 identifies a data unit as valid, then the valid data determination module 302 may select that data unit as ready or eligible for folding or copying. If the data unit is invalid, then the valid data determination module 302 may not select or deem as ineligible that data unit for folding or copying. The valid data determination module 302 may maintain and/or manage a validity log 310 (such as a bitmap) that includes folding information identifying whether each data unit in the one or more source SLC blocks 148 is ready or eligible for folding.

After the valid data determination module 302 creates the validity log 310, the valid data determination module 302 may send the validity log 310 to the ranking list generation and update module 304. In response, the ranking list generation and update module 304 may generate an initial data structure that includes source ranking lists 312 and destination ranking lists 314. Each of the source ranking lists 312 may be associated with one of a plurality of source rankings. Similarly, each of the destination ranking lists 314 may be associated with one of a plurality of destination rankings.

The ranking list generation and update module 304 may be configured to assign a source ranking to each of the source storage pages of the one or more source SLC blocks 148. Each of the source rankings may correspond to a number of unassigned valid data units in a source storage page. A valid data unit in a source storage page may be unassigned when the mapping generation module 306 has not yet mapped the data unit to a destination storage page in the destination MLC block 150. A maximum source ranking may indicate that all of the data units in a source storage page are valid and the mapping generation unit 306 has not yet assigned a destination storage page in the destination MLC block 150 to any of those eight valid data units. For example, the maximum source ranking may be and/or correspond to eight, indicating that the source storage page is storing eight valid data units and none of the eight valid data units have yet to be assigned to a destination storage page of the destination MLC block 150. Source rankings below the maximum source ranking may similarly correspond to the number of unassigned valid data units in a source storage page. For example, a source storage page having a ranking of seven may indicate that the source storage page is storing seven valid data structures that have not yet been assigned to a destination storage page in the MLC block 150. As another example, a source storage page having a minimum source ranking of and/or corresponding to zero may indicate that a source storage page is not storing any valid data structures that have not yet been assigned to a destination storage page in the MLC block 150.

In other configurations, a source ranking may correspond to and/or indicate a number of invalid data units, assigned valid data units, or a combination thereof. For these other configurations, the lower the number, the higher the ranking. A source ranking of zero may be a maximum or highest source ranking indicating that the associated source storage page is storing zero invalid data units and/or assigned valid data units. Various ways of determining source rankings to correspond to unassigned valid data units, assigned valid data units, invalid data units, or combinations thereof may be possible.

Those of skill in the art will appreciate that the idea presented in this disclosure of ranking (both to source location and to destination locations) refers to any ordering or prioritization given to one set of storage units versus another and that the range for the ranking can be based on a numbering system or another range indicative of priority or preference being given to one member of a ranked set versus another member of the same ranked set.

The ranking list generation and update module 304 may be configured to assign a destination ranking to each of the destination storage pages of the destination MLC blocks 148. Each of the destination rankings may correspond to a number of unassigned storage units in a destination storage page. A storage unit in a destination storage page may be unassigned when the mapping generation module 306 has not mapped to it a data unit from the source SLC blocks 148. Hence, an unassigned destination storage unit may be available or eligible to be mapped to a data unit in a source storage page. Conversely, assigned destination storage units may be unavailable or ineligible to be mapped to a data unit, since they will have already been mapped to a data unit by the mapping generation module. A destination storage page having maximum destination ranking may indicate that all of the storage units in the destination storage page are unassigned. For example, maximum destination ranking of and/or corresponding to eight may indicate that all of the storage units of a destination storage page are unassigned and thus available for a mapping. A minimum destination ranking of and/or corresponding to zero may indicate that none of the storage units of a destination storage page are unassigned, and thus none are available for a mapping. Destination rankings in between the maximum and the minimum may indicate that some but less than all of the storage units of a destination storage page are unassigned and available for a mapping.

In other example configurations, a destination ranking may correspond to and/or indicate a number of assigned storage units in a destination storage page. For these other configurations, the lower the number the higher the ranking. A destination ranking of zero may be a maximum or highest destination ranking indicating that the associated destination storage page has zero storage units that have been assigned. Various ways of determining destination rankings to correspond to unassigned storage units, assigned storage units, or combinations thereof may be possible.

The ranking list generation and update module 304 may use the validity log 310 to initially determine how many valid data units are stored in each of the source storage pages of the source SLC blocks 148. Based on the initial determination, the ranking list generation and update module 304 may assign initial source rankings to each of the source storage pages. The ranking list generation and update module 304 may then be configured to initially populate each of the plurality of source ranking lists 312 with corresponding source storage pages. For example, if the ranking list generation and update module 304 assigned a maximum source ranking of eight to a source storage page, then the ranking list generation and update module 304 may place that source storage page in the ranking list 312 associated with the maximum source ranking of eight.

The ranking list generation and update module 304 may similarly assign destination rankings to each of the destination storage pages of the destination MLC block 150 and populate the destination ranking lists 314. However, initially, since the mapping generation module 306 has not yet mapped any data units to destination storage pages, all of the destination storage pages may be assigned a maximum destination ranking of 8 and placed in the destination storage list associated with the maximum destination ranking.

After initially populating the source and destination ranking lists 312, 314, the ranking list generation and update module 304 may provide the ranking lists 312, 314 to the mapping generation module 306. The mapping generation module 306 which may use the lists 312, 314 to generate a source-to-destination mapping that maps each of the valid data units in the source SLC blocks 148 to a destination storage page in the destination MLC block 150. In addition, as described in more detail below, the source-to-destination mapping may indicate for each data unit whether the data unit is to be transferred to the destination MLC block 150 using OCC or CTC.

As part of a first or initial stage of generating the source-to-destination mapping, the mapping generation module 306 may map data units to destination storage pages on a page-by-page basis, starting with data units stored in source storage pages assigned to the maximum source ranking and moving in descending order. By being mapped on a page-by-page basis, all of the valid data units of a single source storage page may be mapped to the same destination storage page. Additionally, the process by which destination storage pages are selected for mapping may vary, although in some example configurations, the destination storage pages are selected in consecutive order, starting with an initial destination storage page.

As previously described, all of the data storage pages may be initially assigned the maximum destination ranking since none of the destination storage pages will have been mapped to data units. During the initial stage, data units may be mapped to destination storage pages on a page-by-page basis until there are no more data storage pages having the maximum destination ranking. For example, suppose a destination MLC block 150 has nine destination storage pages that are initially available for mapping. During the initial mapping stage, the mapping generation module 306 may map on a page-by-page basis data units stored in the top nine highest-ranked source storage pages to the nine destination storage pages.

Data units mapped during the initial stage of the mapping may be copied to their destination locations in the destination MLC block 150 using OCC. For some example configurations, in addition to identifying destination locations for these data units, the source-to-destination mapping information may indicate for each data unit that it is to be transferred to the destination MLC block using OCC.

Information about the source-to-destination mapping may be fed back to the ranking list generation and update module 304, which may update or revise each of the source and destination ranking lists 312, 314 based on the source-to-destination mapping information. For some example configurations, the mapping generation module 306 may feedback the source-to-destination mapping information at the end of the initial stage. For other example configurations, the mapping generation module 306 may continually feedback the source-to-destination mapping information as the mappings are made during the initial stage, and the ranking list generation and update module 304 may continually update or revise each of the source and destination ranking lists 312, 314.

In a particular example configuration, for each of the source storage pages, the ranking list generation and update module 304 may decrement a source ranking of a source storage page in proportion to the number of data units stored in that source storage page that were mapped to a destination storage page. For example, during the initial stage of the mapping, if eight valid data units stored in a source storage page assigned to the highest source ranking of eight are all mapped to a destination storage page, the ranking list generation and update module 304 may change the source ranking of that source storage page to zero to indicate that the source storage page has no more unassigned data units that need mapping. Source storage pages assigned source rankings other than the maximum may be similarly decremented.

Similarly, for each of the destination storage pages, the ranking list generation and update module 304 may decrement a destination ranking of a destination storage page in proportion to the number of storage units that were mapped to a data unit. For example, during the initial stage of the mapping, if eight storage units of a destination storage page assigned the highest destination ranking of eight were mapped to eight data units, the ranking list generation and update module 304 may change the destination ranking of that destination storage page to zero to indicate that the destination storage page has no more unassigned storage units available for mapping. Similarly, if seven storage units of a destination storage page assigned the highest destination ranking of eight were mapped to only seven data units, the ranking list generation and update module 304 may change the destination ranking of that destination storage page to one (eight minus seven) to indicate that the destination storage page has one unassigned storage unit still available for mapping.

In addition, for some example configurations, the source ranking lists 312 and the destination ranking lists 314 each may not include a list associated with a minimum ranking (e.g., a ranking of zero). Since source storage pages having a ranking of zero are not storing any valid data units that have not yet been assigned, they may be removed from the source ranking lists 312 since they may no longer be considered by the mapping generation module 306 for mapping. Similarly, since destination storage pages having a ranking of zero do not have any storage units available for mapping, they may be removed from the destination ranking lists 314.

After updating the source and destination ranking lists 312, 314, the ranking list generation and update module 304 may send the updated lists 312, 314 to the mapping generation module 306 for a second stage of mapping. During the second stage, the mapping generation module 306 may map data units of a source storage page to a destination storage page when the source storage page has a source ranking that matches a destination ranking of the destination storage page. Otherwise stated, during the second stage, for each of the destination storage pages that have at least one data unit available for mapping (i.e., a destination ranking greater than zero), the mapping generation module 306 may look for source storage pages storing the same number of unassigned valid data units as the destination storage pages have storage units available for mapping.

As an illustration, suppose during the initial stage of mapping, seven valid data units from a source storage page having a source ranking of seven are mapped to a destination storage page having a destination ranking of eight. As a result, the destination ranking of the destination storage page may be changed from eight to one to indicate that that destination storage page has only one more storage unit available for mapping. During the second stage of mapping, the mapping generation module 306 may look for source storage pages having a ranking of one, and upon identifying such a source storage page, may map the single data unit stored in that source storage page to the destination storage page having the destination ranking of one.

By matching the source and destination rankings during the second stage, the mapping generation module 306 is attempting reduce the source and destination rankings to zero as much as possible, while minimizing the number of sense operations to be performed to copy the data. However, the data units mapped during the second stage may be copied to their destination locations using CTC instead of OCC.

As an illustration, suppose during the initial stage, five valid data units stored in a source storage page having a source ranking of five are mapped to a destination storage page. The destination ranking assigned to the destination storage page may be accordingly changed to three. Then during the second stage of mapping, three valid data units stored in a source storage page with a source ranking of three may be mapped to the destination storage page. The five valid data units mapped during the initial stage may be copied to the destination storage page using OCC, and the three valid data units mapped during the second stage may be copied to the destination storage page using CTC. In other words, when copying the combination of the five and three valid data units, the three valid data units mapped during the second stage may be transferred to the controller 110 under CTC, but the five valid data units mapped during the initial stage may not under OCC. However, because three valid data units from a single source storage page with a source ranking of three were selected for mapping, rather than three valid data units from multiple different source storage pages with individual source rankings less than three, the number of sense operations may be minimized.

Again, the mapping generation module 306 may feed back the source-to-destination mapping information to the ranking list generation and update module 304 for another update of the source and destination ranking lists 312, 314. For some example configurations, the mapping generation module 306 may feedback the source-to-destination mapping information at the end of the second stage. For other example configurations, the mapping generation module 306 may continually feedback the source-to-destination mapping information as the mappings are made during the second stage, and the ranking list generation and update module 304 may continually update or revise each of the source and destination ranking lists 312, 314 as the mappings are made. In response to receipt of the mapping information, the ranking list generation and update module 304 may decrement source and destination rankings and remove source and destination storage pages with zero rankings from the lists 312, 314 as appropriate. After revising the source and destination ranking lists 312, 314, the ranking list generation and update module 304 may provide the updated ranking lists 312, 314 to the mapping generation module 306 for a third stage of mapping.

After mapping is performed during the second stage of mapping and the source and destination ranking lists 312, 314 are updated, there may be no remaining source and destination storage pages having respective source and destination rankings that are the same. During the third stage, the mapping generation module 306 may map data units to destination storage pages based on the highest source and destination rankings for the destination and source storage pages having entries remaining in the lists 312, 314. In particular, the mapping generation module 306 may start with a destination storage page having the highest destination ranking and map that destination storage page to data units stored in a source storage page having the highest source ranking. The mapping generation module 306 may then move onto a destination storage page with the next highest destination ranking and map it with data units stored in a source storage page with a next highest source ranking. The mapping generation module 306 may continue until it has gone through all of the entries in the destination ranking lists 314 or there are no more entries in the source ranking lists 312.

Similar to the mappings that occur during the second stage of mapping, data units that are mapped during the third stage of mapping may be copied to the destination MLC block 150 using CTC. Accordingly, when generating mapping information, the mapping generation module may also indicate that these data units that were mapped during the third stage may be copied using CTC.

The mapping generation module 306 may send the updated source-to-destination mapping information during and/or after the third stage back to the ranking list generation and update module 304, which will again update the source and destination ranking lists 312, 314 and provide them to the mapping generation module 306. Using the updated source and ranking lists 312, 314, the mapping generation module 306 may perform subsequent mapping in accordance with the third stage. An iterative back-and-forth process between the ranking list generation and update module 304 and the mapping generation module 306 may continue until there are no more entries in the source ranking list 312 and the destination ranking list 314—i.e., all of the valid data units in the source SLC blocks 148 have been mapped to a destination storage page by the mapping generation module 306.

When there are no more entries remaining in the source and destination ranking lists 312, 314, then the mapping generation module 306 may determine that it is finished mapping and the source-to-destination mapping (or folding vector) is complete. The mapping generation module 306 may then send the completed source-to-destination mapping to a copy module 316, which may copy the valid data units in the source SLC blocks 148 to the destination block 150 in accordance with the completed source-to-destination mapping. With the completed source-to-destination mapping received from the mapping generation module 306, the copy module 316 may identify which destination storage page in the destination MLC block 150 each of the valid data units is to be copied and also the operation—OCC or CTC—to use to copy each of the data units.

Ideally, when there are no more source entries in the source ranking lists 312, there are also no more destination entries in the destination ranking lists 314. That is, ideally, when all of the valid data units are mapped, there are also no more destination storage pages with storage units that are available for mapping. However, in some situations, when there are no more source entries in the source ranking lists 312, there may still be destination storage pages with available storage units. For these situations, various options may be possible. For example, predetermined or fixed values or invalid ("dummy") data units may be mapped and ultimately written to the available storage units. As another example, available destination storage units may be left available or "empty," and the mapping generation module 306 may be configured to update or modify the source-to-destination mapping as necessary such that the available destination storage units are at the end of each of the destination storage pages—that is, there are no available or unmapped storage units in between two mapped storage units. As a result, the copy module 316 may perform a "partial copy" for some of the destination storage pages and the destination storage block may be left open for future or subsequent copying. In still another example, only destination storage pages that are completely empty—that is all of their storage units are unmapped—may be left empty. The available or unmapped storage units that are part of destination storage pages that also have mapped storage units may be programmed with predetermined or fixed values or with invalid ("dummy") data units. Various way or combinations of ways to handle available storage units after all of the valid data units are mapped may be possible.

In addition, for some example implementations, the controller 110 may determine to copy the valid data units from the source SLC blocks 148 to the destination MLC block 150 without using OCC. That is, at some point before copying the data, the controller 110 may determine to transfer all of the data to be copied to it using CTC. For example, one limitation to copying using OCC is that data that is copied may not be detected or corrected for errors, such as by using the ECC module 122 of the controller 110. The controller 110 may determine that it wants to perform an error analysis on the data before it is copied, and so may decide it does not want to use OCC to copy any of the data. Accordingly, when the mapping generation module 306 performs the mapping, the mapping generation module may either identify each of the mappings made during the initial stage as CTC instead of OCC, or instead, may skip the initial stage and proceed right to mapping under the second stage.

In other example embodiments, generating the source-to-destination mapping may be performed concurrently with generating the copy commands. That is, rather than the mapping generation module 306 sending a completed source-to-destination mapping (or map) to the copy module 316, the mapping generation module 306 may send individual mappings or groups of mappings to the copy module 316 as it determines them in the first, second, and/or third stages before an entire source-to-destination mapping is completed.

For example, when the mapping generation module 306 determines a mapping of a source data unit in a source storage page to a destination storage unit, the mapping generation module 306 may provide the mapping to the copy module 316 for generation of a copy command to copy that source data unit to the destination storage area. The mapping generation module 316 may provide that information before it has completed an entire source-to-destination mapping for the source data to be copied. In this sense, generation of a source-to-destination mapping is not a separate process that is performed and completed for all of the source data units before the copy module 316 copies the data, but rather as part of the copy command generation process for which source and destination information is determined.

As used in this disclosure, the terms "map" and/or "mapping" refer to any structure, protocol, process, or method that creates, preserves, records, defines, assigns, or establishes an association between a first location, such as a source location, and a second location, such as a destination location.

FIGS. 4-19 illustrate an example implementation of generating a source-to-destination mapping as described above. The example implementation is shown and described under the presumption that the controller 110 wants data to be copied using OCC if possible. FIG. 4 is a diagram of an example validity log that may be generated by the valid data determination module 302. As shown in FIG. 4, an example source SLC block having eighteen source storage pages (SSP) 0-17 may be selected or chosen for a copy or folding operation. Each of the eighteen source storage pages may capable of storing eight data units. Valid data units are shown in FIG. 4 as being labeled, such as U1, U2, U3, etc. Invalid data units are shown in FIG. 4 as not labeled or left blank. Although not necessarily included in a validity log, initial source ranks are shown next to each of the source storage pages. For example, the first source storage page (SSP 0) has an initial source rank of eight because all eight data units are valid.

FIG. 5 shows an example source-to-destination mapping in an initial state for an example destination MLC block, which is shown in FIG. 5 as having nine destination storage pages (DSP) 0-8. Also, since no mappings have yet occurred, each of the destination storage pages may be assigned an initial maximum destination rank of eight.

FIG. 6 shows initial source ranking lists that may be generated by the ranking list generation and update module 304 based on the validity log shown in FIG. 4. As shown in FIG. 6, there are eight source ranking lists, each associated with one of the source ranks 1-8. Based on the validity log shown in FIG. 4, the source ranking list associated with Rank 8 may be initially populated with SSP 0 and SSP 1; the source ranking list associated with Rank 7 may be initially populated with SSP 3, SSP 12, and SSP 13; there are no SSPs with which to populate the source ranking list associated with Rank 6; the source ranking list associated with Rank 5 may be initially populated with SSP 6 and SSP 10; the source ranking list associated with Rank 4 may be initially populated with SSP 4, SSP 5, and SSP 15; the source ranking list associated with Rank 3 may be initially populated with SSP 7 and SSP 17; the source ranking list associated with Rank 2 may be initially populated with SSP 8 and SSP 14; and the source ranking list associated with Rank 2 may be initially populated with SSP 2, SSP 9, and SSP 16.

FIG. 7 shows initial destination ranking lists that may be generated by the ranking list generation and update module 304 based on the size of the destination MLC block. All of the destination storage pages DSP 0-8 may be initially give a rank of eight since mapping has not yet occurred.

After the initial source and destination ranking lists are generated, the ranking list generation and update module 304 may provide the lists to the mapping generation module 306 to perform an initial stage of mapping. FIG. 8 shows the source-to-destination mapping after the initial stage of the mapping. As shown in FIG. 8, with reference also to FIGS. 4 and 6, the mapping generation module 306 may initially look to the highest ranking list, which in this case is Source Ranking List 8, and map the eight valid data units stored in SSP 0 to DSP 0 and map the eight valid data units stored in SSP 1 to DSP 1. Since the Source Ranking List 8 has no more entries, the mapping generation module 306 may next look to Source Ranking List 7 and map the seven valid data units stored in SSP 3 to DSP 2, map the seven valid data units stored in SSP 12 to DSP 3, and map the seven valid data units stored in SSP 13 to DSP 4. Then, since there are no entries in Source Ranking List 6, the mapping generation module 306 may next look to Social Ranking List 5 and map the five valid data units stored in SSP 6 to DSP 5 and the five valid data units stored in SSP 10 to DSP 6. Then, looking at Source Ranking List 4, the mapping generation module 306 may map the four valid data units stored in SSP 4 to DSP 7 and the four valid data units stored in SSP 5 to DSP 8. Subsequently, since the mapping generation module 306 has reached the last destination storage page DSP 8, the mapping generation module 306 may conclude the initial mapping stage and send the source-to-destination mapping information back to the ranking list generation and update module 304, for updates of the source and destination ranking lists.

Still referring to FIG. 8, in addition to the unit numbers shown in the source-to-destination mapping in FIG. 8, a small letter "O" is shown in the upper-right corner of each of mappings to indicate that OCC is to be used to transfer these data units to the destination MLC block.

FIG. 9 shows updated source ranking lists and FIG. 10 shows updated destination ranking lists following the initial stage of the mapping performed by the mapping generation module 306. Since all of the valid data units stored in the nine highest ranked source storage pages SSP 0, SSP 1, SSP 3, SSP 12, SSP 13, SSP 6, SSP 10, SSP 4 and SSP 5 were mapped to destination storage pages 0-9 during the initial mapping stage, these entries are removed from the source ranking lists altogether, as shown in FIG. 9. Additionally, since destination storage pages DSP 0 and DSP 1 were each mapped to eight valid data units, these entries are removed from the destination ranking lists. Since destination storage pages DSP 2, DSP 3, and DSP 4 were each mapped to seven valid data units, these entries are moved from Destination Ranking List 8 to Destination Ranking List 1. Since destination storage pages DSP 5 and DSP 6 were each mapped to five valid data units, these entries are moved from Destination Ranking List 8 to Destination Ranking List 3. And since destination storage pages DSP 7 and DSP 8 were each mapped to four valid data units, these entries are moved from Destination Ranking List 8 to Destination Ranking List 4.

After updating the source and destination ranking lists, the ranking list generation and update module 304 may identify that there are still entries in the source and destination ranking lists, and in response send the updated lists to the mapping generation module 306 to perform the second stage of mapping. FIG. 11 shows the source-to-destination mapping after completing the second stage. In particular, and also with reference to FIGS. 4, 9, and 10, during the second stage, the mapping generation module 306 may start with the highest-ranked entries in the destination ranking lists and map the four valid data units stored in SSP 15 to DSP 7, leave DSP 8 in Destination Ranking List 4 unassigned since there are no more entries in Source Ranking List 4, map the three valid data units stored in SSP 7 to DSP 5, map the three valid data units stored in SSP 17 to DSP 6, leave SSP and SSP 14 in Source Ranking List 2 unassigned since there are no entries in Ranking List 2, map the single valid data unit stored in SSP 2 to DSP 2, map the single valid data unit stored in SSP 9 to DSP 3, and map the single valid data unit stored in SSP 16 to DSP 4.

In addition, the valid data units that are mapped to destination storage pages during the second stage may be copied using CTC. Accordingly, as shown in FIG. 11, a letter "C" is shown in the upper-right corner of each of these mappings to indicate that CTC is to be used to copy these data units to the destination MLC block. After analyzing the last entry in the destination ranking lists, destination storage page DSP 4, the mapping generation module 306 may conclude the second mapping stage and send the updated source-to-destination mapping information back to the ranking list generation and update module 304, for updates of the source and destination ranking lists.

FIG. 12 shows updated source ranking lists and FIG. 13 shows updated destination ranking lists following the second stage of the mapping performed by the mapping generation module 306. During the second mapping stage, source ranking list entries having data units that were mapped may be removed since they may not have any more unassigned data units. Accordingly, SSP 15 from Ranking List 4, SSP 7 and SSP 17 from Ranking List 3, and SSP 2, SSP 9, and SSP 16 from Ranking List 1 may be removed from the source ranking lists, as shown by comparing FIGS. 9 and 12. Additionally, destination storage pages that were mapped during the second stage may be removed because they may have no more unassigned storage units. Accordingly, DSP 7 in Ranking List 4, DSP 5 and DSP 6 in Ranking List 3, and DSP 1, DSP 3 and DSP 4 in Ranking List 1 may be removed from the destination ranking lists, as shown by comparing FIGS. 10 and 13.

After updating the source and destination ranking lists, the ranking list generation and update module 304 may identify that there are still entries in the source ranking lists and the destination ranking lists, and in response send the updated lists to the mapping generation module 306 to perform the third stage of mapping. FIG. 14 shows the source-to-destination mapping after completing the third stage. In particular, and also with reference to FIGS. 4, 12, and 13, there are no source storage pages having a source ranking that the destination ranking of any of the destination storage pages remaining in the destination ranking lists. Accordingly, starting the highest ranked DSP entry, the mapping generation module 306 may map the highest ranked DSP entry in the destination ranking lists with the highest ranked SSP entry in the source ranking lists. In this case, with reference to FIGS. 12 and 13, the mapping generation module may map the two valid data units stored in SSP 8 to DSP 8.

In addition, since during the third stage, the data units that are mapped will be copied using CTC. Accordingly, as shown in FIG. 14, a letter "C" is shown in the upper-right corner of each of mappings during the second and third stages to indicate that CTC is to be used to copy these data units to the destination MLC block. After analyzing the last entry in the destination ranking lists, in this case destination storage page DSP 8, the mapping generation module 306 may send the updated source-to-destination mapping information back to the ranking list generation and update module 304, for updates of the source and destination ranking lists. At this point, the mapping generation module 306 may not know if there remains source entries in the source ranking lists 312 or destination entries in the destination ranking lists 314, and so may not yet conclude the third stage.

FIG. 15 shows updated source ranking lists and FIG. 16 shows updated destination ranking lists following the mapping performed during the third stage. Since thus far during the third stage the valid data units stored in SSP 14 were not mapped, SSP may remain as a source entry in Source Ranking List 2. Also, since only two of the four available storage units of DSP 8 were mapped during the third stage, the ranking for DSP 8 is decreased to two and the destination entry associated with DSP 2 is moved from Destination Ranking List 4 to Destination Ranking List 2. After updating the source and destination ranking lists, the ranking list generation and update module 304 may identify that there remains source entries in the source ranking lists or destination entries in the destination lists and in response, send the updated lists to the mapping generation module 306.

Upon receipt of the updated lists, the mapping generation module 306 may identify that there are still entries in the source and destination ranking lists 312, 314 and continue mapping under the third stage. In this example there is, as shown in FIGS. 15 and 16, the mapping generation module 306, while continuing the third stage, may map the two valid data units associated with SSP 14 to DSP 2. This final mapping is illustrated in the updated source-to-destination mapping shown in FIG. 17.

FIG. 18 shows updated source ranking lists and FIG. 19 shows updated destination ranking lists following the continued third stage of the mapping performed by the mapping generation module 306. In this example, since the two valid data units stored in SSP 14 were mapped to DSP 8, the source entry for SSP 14 may be removed from the source ranking lists and the destination entry for DSP 8 may be removed from the destination ranking lists. In addition, as shown in FIG. 18, there are no more entries in the source ranking lists 312 or the destination ranking lists 314, indicating that there are no more source storage pages with unmapped valid data units or unmapped destination storage units. Upon identification that there are no more unmapped valid data units or destination storage units, the mapping generation module 306 may determine that mapping is finished and in response, send the completed source-to-destination mapping to the copy module 316.

The source and destination ranking lists may be implemented or managed in various ways. In FIGS. 6, 7, 9, 10, 12, 13, 15, 16, 18, 19, the source and destination ranking lists are shown as being populated with all of the SSP and DSP entries assigned to the associated source and destination rankings. However, other ways may be possible. For example, the source and destination ranking lists may be implemented as linked lists, where each list includes a single entry and the contents of that entry point to a next entry in the list. Various ways or combinations of ways of implementing or managing the lists may be possible.

In an alternative example mapping generation scheme, the ranking list generation and update module 304 may be configured to divide some of the source ranking lists into separate sections, including single plane (SP) sections that are populated with source storage page entries that store valid data units spanning only a single plane, and a multi-plane (MP) section that is populated with source storage page entries that store valid data units spanning multiple planes. Such a mapping scheme may further maximize the number of OCC operations compared to the mapping scheme described above.

As previously described, different sets of data units stored in different source storage pages that are mapped to the same destination storage page may all be copied to the same destination storage page using OCC if the two sets are completely stored in different planes from each other. In order to maximize the number of OCC operations, the ranking list generation and update module 304 may keep track of which source storage pages are storing valid data units in only a single plane and which source storage pages are storing valid data units in multiple planes. The mapping generation module 306 may then use that information when determining the source-to-destination mapping.

FIG. 20 shows example source ranking lists when factoring in the planes in which the valid data bits are stored in the source storage pages. As shown in FIG. 20, each of Source Ranking List 2, Source Ranking List 3, and Source Ranking List 4 may include single plane (SP) sections and a multi-plane section (MP). The single plane sections associated with each of the rankings may include a first single plane section SP (0) and a second single plane section SP (1). The single plane sections are populated with source storage plane entries that have valid data units stored in only a single plane. Additionally, source storage pages storing valid data units in only a first plane, Plane 0, may have entries placed in the first single plane sections SP (0) and source storage pages storing valid data units in only a second plane, Plane 1, may have entries placed in the second single plane sections SP (1). The multi-plane sections are populated with source storage plane entries that have valid data units stored in multiple planes. The Source Ranking Lists 5-8 may not have different sections since by default those lists will not include entries having valid data units stored in only a single plane. Similarly, Source Ranking List 1 may not have different sections since by default that list will not include entries having multiple data units stored in multiple planes.

Referring back to FIG. 4 and using the example described above, the validity log shows which valid data units are stored in the first plane, Plane 0, and which valid data units are stored in the second plane, Plane 1. Referring back to FIG. 20, source storage pages SSP 4, SSP, 5, and SSP 15 each store four valid data units only in one plane. The source storage pages SSP 4 and SSP 5 may store data in only the first plane, Plane 0. Accordingly, the source storage pages SSP 4 and SSP 5 may each include entries in the first single plane section SP (0) of Source Ranking List 4. In addition, the source storage pages SSP 15 and SSP 14 may store data in only the second plane, Plane 1. Accordingly, the source storage page SSP 15 may include an entry in the second single plane section of Source Ranking List 4, and the source storage page SSP 14 may include an entry in the second single plane section of Source Ranking List 2. In addition, source storage pages SSP 7 and SSP 17 each store three valid data units in both planes. Accordingly, the source storage pages SSP 7 and SSP 17 are stored in the multi-plane (MP) section of Source Ranking List 3. Further, source storage page SSP 8 stores two valid data units, one in each plane, and thus has an entry in the multi-plane section of Source Ranking List 2.

In addition, as shown in FIG. 20, each of the entries in the single plane sections may indicate which plane the valid data units are all being stored. For example 20, entries SSP 4 and SSP 5 include a zero in parentheses, "(0)", to indicate that the associated source storage pages store valid data units in only the first plane, Plane 0. Similarly, entries SSP 15 and SSP 14 include a one in parentheses, "(1)", to indicate that the associated source storage pages store valid data units in only the second plane, Plane 1.

When the mapping generation module 306 maps the data units to the destination storage pages, the mapping generation module 306 may give preference to entries in the single plane section over entries in the multi-plane section, during each mapping stage.

FIG. 21 shows that following the initial mapping stage, the entry SSP 15 remains in the single plane section of Source Ranking 4, as the valid data units for SSP 4 and SSP 5 were mapped to destination storage pages DSP 7 and 8, respectively, and were thus removed from the source ranking lists. Referring back to FIG. 8, the valid data units for SSP 4 and SSP 5 may be mapped to the same plane, Plane 0, as they are being stored in their respective source storage pages.

Referring to FIG. 22, the destination ranking lists may also include single plane sections, including a first single plane section SP (0) and a second single plane section SP (1), and a multi-plane section for some of the destination ranking lists. In particular, Destination Ranking Lists 4, 5, 6, and 7 may each include single plane sections SP (0) SP (1) and a multi-plane section MP as each of these destination ranking lists may include entries corresponding to destination storage paths that are mapped to data units located in only one plane. Destination Ranking Lists 1, 2, and 3 may not include multiple sections since entries in those lists will only correspond to destination storage paths mapped to valid data units located in more than one plane. Similarly, Destination Ranking List 8 may not include multiple sections since entries in those lists will correspond to destination storage paths not mapped to any valid data units.

Referring back to the example, after the initial mapping stage, destination entry DSP 4 is moved to the single plane section of Ranking List 4 because it was mapped to valid data units stored in SSP 4, all of which were stored in the first plane, Plane 0. Further, a one in parentheses, "(1)", is included with the destination entry DSP 7 because the remaining available storage units of DSP 7 are all located in the second plane, Plane 1. A similar determination is made for DSP 8.

During the second stage of mapping, the valid data units of SSP 15 may be mapped to DSP 7. Further, because the SSP 15 source entry is in the second single plane section SP (1) of Source Ranking List 4 and/or indicates that all of its valid data units are stored in the second plane, Plane 1 and the DSP 7 destination entry is in the second single plane section SP (1) of the Destination List 4 and/or indicates that all of its available storage units are located in the second plane, Plane 1, the mapping generation module 306 may determine that the valid data units stored in SSP 15 may be copied to DSP 7 using OCC. For some example mapping schemes, if alternatively, all of the available storage units for DSP 7 were in the first plane, Plane 0, such that OCC could not be used, the mapping generation module 306 may initially skip DSP 7 and look to the next entry, DSP 8 and determine whether the valid data units stored in SSP 15 can be copied to DSP 8. If so, then the mapping generation module 306 may map the valid data units of SSP 15 to DSP 8 instead of DSP 7. Also, as described above, the mapping generation module 306 may give preference or look to entries in the single plane section before looking to entries in the multi-plane section. Accordingly, although not shown in the example, if suppose DSP 7 was placed in the multi-plane section of Destination Ranking List 4, then the mapping generation module 306 may look to map the valid data units of SSP 15 to DSP 8 before looking to map the valid data units to DSP 7.

Referring to FIGS. 23 and 24, after the second mapping stage, the source entries include SSP 14 in the second single plane section SP (1) of Source Ranking List 2 and SSP 8 in the multi-plane section of Source Ranking List 2. Accordingly, the mapping generation module 306 may look to map the valid data units of SSP 14 to DSP 8 before it looks to map the valid data units of SSP 8 to DSP 8. Further, the mapping generation module 306 may identify that all of the available storage units of DSP 8 are in the second plane, Plane 1, and all of the unassigned valid data units of SSP 14 are also in the second plane, Plane 1. Accordingly, the mapping generation module 306 may determine that OCC rather than CTC may be used to copy the valid data units of SSP 14 to the destination storage page associated with DSP 8. Subsequently, the mapping generation module 306 may determine to map the valid data units of SSP 8 to DSP 8, and further determine to use CTC to copy those data units.

As shown in FIGS. 20-24, two additional OCC operations were identified by identifying the planes in which the valid data units are stored, in comparison to the first implementation that did not factor the planes in which the valid data units are stored. FIG. 25 shows a completed source-to-diagram destination mapping when the planes are factored in into the mapping decisions made by the mapping generation module 306. As shown in FIG. 25, the valid data units stored in SSP 15 (data units U124-127) are identified as being mapped to DSP 7 with OCC instead of CTC. In addition, the valid data units stored in SSP 14 (data units U118 and U119) are identified as being mapped to DSP 8 with OCC instead of CTC.

The above examples described with respect to FIGS. 1-25 are described with a validity log and source and destination ranking lists generated for a single source SLC block. In other situations, multiple SLC blocks may be selected for folding to a destination MLC block, such that multiple validity logs, one corresponding to each of the SLC blocks, may be generated. To achieve optimum mapping results—i.e., maximum OCC operations and minimum sense operations—the source ranking lists may be initially populated using all of the validity logs and then doing the mapping, as opposed to populating and mapping one at a time. As an illustration, suppose the storage device 102 determines to fold three source SLC blocks 148 to an MLC block 150. Accordingly, the valid data determination module 306 may generate three validity logs, one for each of the three source SLC blocks 148. The ranking list generation and update module 304 may then initially generate a single set of source ranking lists using all three validity logs and then pass the single set to the mapping generation module 306 for mapping. Such an implementation may lead to more optimum mapping results than a mapping scheme in which the mapping module performs mapping using a first set of ranking lists generated for the first validity log, then performs mapping using a second set of ranking lists generated for the second validity log, and then performs mapping using a third set of ranking lists generated for the third validity log.

In addition, while the above functions and operations are described in the context of a folding operation where data may be moved from one or more source SLC blocks 148 to one or more destination MLC blocks 150, similar operations may be performed for moving data between blocks of the same bit-per-cell density (such as from one or more source SLC blocks to one or more destination SLC blocks or from one or more source MLC blocks to one or more destination MLC blocks), or between blocks having different multi-bit per cell densities, such as from one or more source MLC blocks having a two bits per cell density to one or more destination MLC blocks having a three bits per cell density.

Additionally, the plurality of modules shown in and described with reference to FIG. 3, including the valid data determination module 302, the ranking list generation and update module 304, the mapping generation module 306, and the copy module 316, may be implemented in the controller 110, the memory controller 142, or a combination thereof. In addition, each of the modules may be implemented in hardware or a combination of hardware and software. For example, each module may include an integrated circuit such as an application specific integrated circuit (ASIC) or a field programmable gate array (FPGA), a circuit, a digital logic circuit, an analog circuit, a combination of discrete circuits, gates, or any other type of hardware or combination thereof. In addition or alternatively, each module may include memory hardware, such as a portion of the controller memory 118 or the memory 132, for example, that comprises instructions executable with the processor 112, a processor of the memory controller 142, or other processor, to implement one or more of the features of the module. When any one of the module includes the portion of the memory that comprises instructions executable with a processor, the module may or may not include the processor. In some examples, each module may just be the portion of the controller memory 118, the memory 132, or other physical memory that comprises instructions executable with a processor to implement the features of the corresponding module without the module including any other hardware. Because each module includes at least some hardware even when the included hardware comprises software, each module may be interchangeably referred to as a hardware module.

Figure 26A:
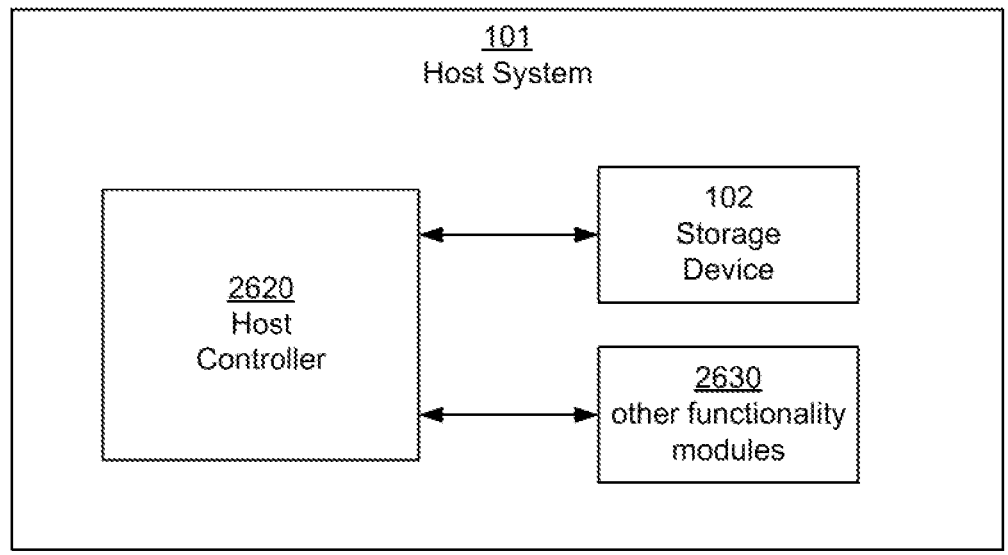
FIG. 26A is a block diagram of the storage device shown in FIG. 1 embedded in a host.
Figure 26B:
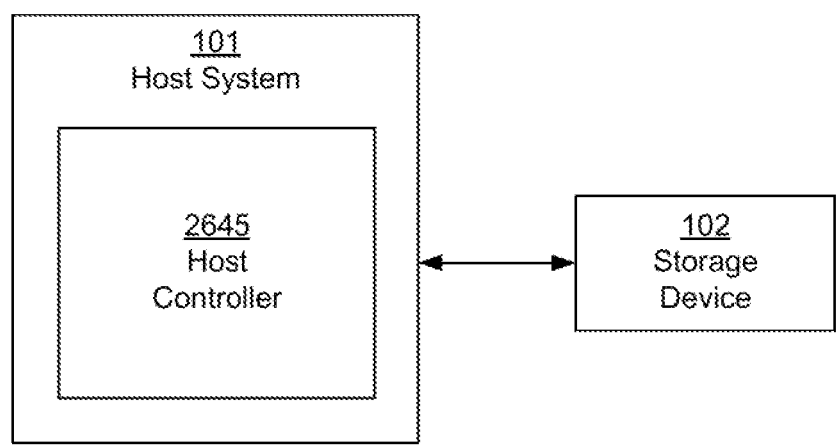
FIG. 26B is a block diagram of the storage device shown in FIG. 1 removably connected with a host.

Referring to FIGS. 26A and 26B, for some embodiments, the storage device 102 may be implemented with the host system 101 by being an embedded device of the host system 101 or by being removably connected with the host system 101. FIGS. 26A and 26B show these implementations. As shown in FIG. 26A, the storage device 102 may be embedded in the host system 101. In addition to embedding the storage device 102, the host system 101 may have a host controller 2620. That is, the host system 101 may embody the host controller 2620 and the storage device 102, such that the host controller 2620 interfaces with the embedded storage device 102 to manage its operations. For example, the storage device 102 can take the form of an iNAND™ eSD/eMMC embedded flash drive by SanDisk Corporation. The host controller 2620 may interface with the embedded storage device 102 using the host interface 116 (FIG. 1). Additionally, when the storage device 102 is embedded in the host system 101, some or all of the functions performed by the controller 110 in the storage device 102 may instead be performed by the host controller 2620.

The host system 2610 can take any form, such as, but not limited to, a solid state drive (SSD), a hybrid storage device (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 26A, the host system 101 can include optional other functionality modules 2630. For example, if the host system 101 is a mobile phone, the other functionality modules 2630 can include hardware and/or software components to make and place telephone calls. As another example, if the host system 101 has network connectivity capabilities, the other functionality modules 2630 can include a network interface. These are just some examples, and other implementations can be used. Also, the host system 101 can include other components (e.g., an audio output, input-output ports, etc.) that are not shown in FIG. 26A to simplify the drawing.

In an alternative configuration shown in FIG. 26B, instead of being an embedded device in a host system, the storage device 102 may have physical and electrical connectors that allow the storage device 102 to be removably connected to the host system 101 (having a host controller 2645) via mating connectors. As such, the storage device 102 may be a separate device from (and is not embedded in) the host system 101. In this example, the storage device 102 can be a removable memory device, such as a Secure Digital (SD) memory card, a microSD memory card, a Compact Flash (CF) memory card, or a universal serial bus (USB) device (with a USB interface to the host), and the host system 102 is a separate device, such as a mobile phone, a tablet computer, a digital media player, a game device, a personal digital assistant (PDA), a mobile (e.g., notebook, laptop) personal computer (PC), or a book reader, for example.

Additionally, referring to FIG. 1, the memory 132 may be a semiconductor memory device that includes volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

Figure 27:
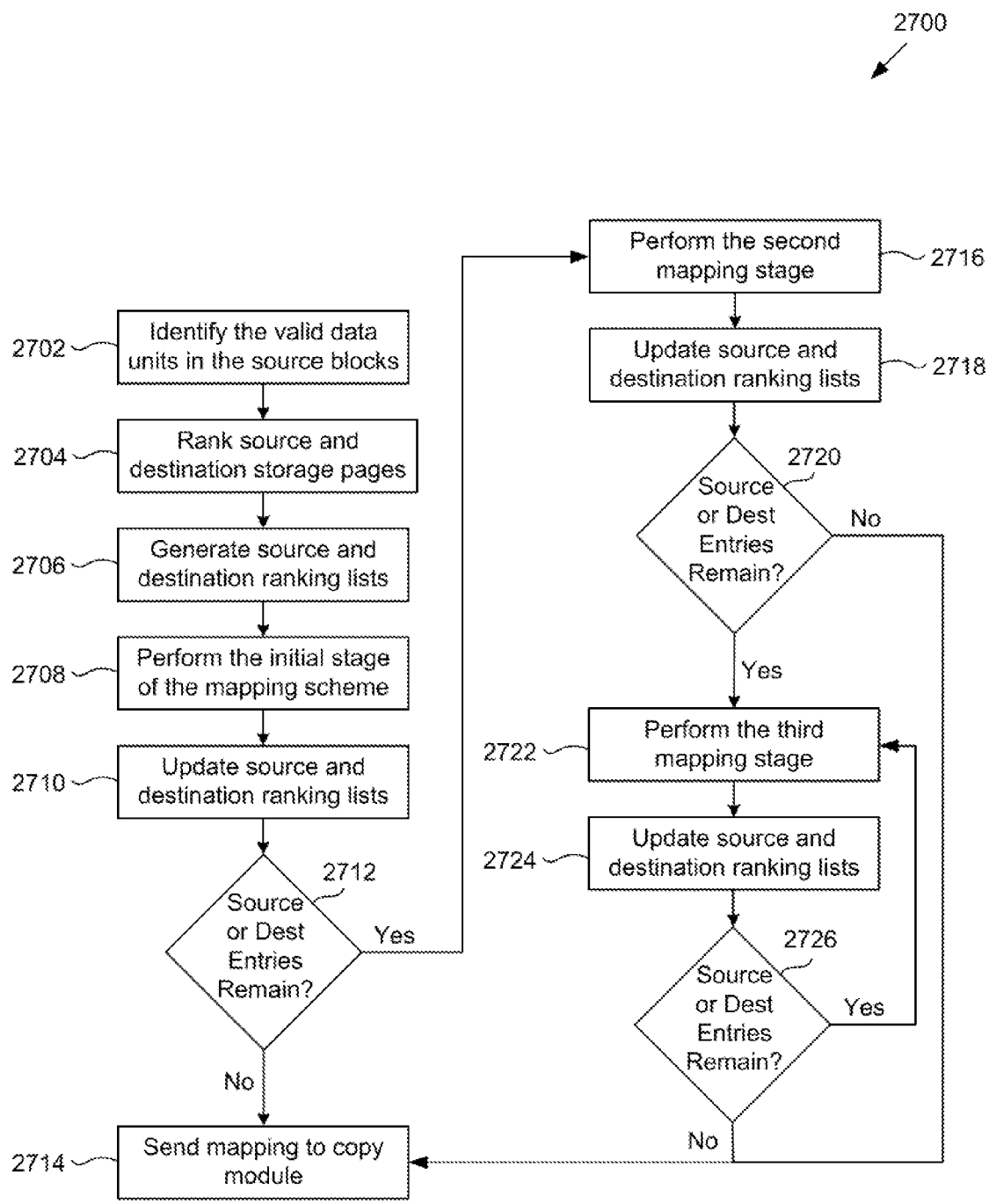
FIG. 27 is a flow chart of an example method of generating a source-to-destination mapping.

FIG. 27 is a flow chart of an example method 2700 of generating a source-to-destination mapping for a copy or folding operation performed in a storage device, in which data units are copied from one or more source blocks to a destination block of memory. At block 2702, a valid data determination module may identify data units of the source blocks that are valid and generate a validity log that identifies the valid data units. For some example methods, the validity log may also identify a plane in which each valid data unit is stored.

At block 2704, a ranking list generation and update module may initially rank each of the source storage pages of the source blocks and the destination storage pages. As previously described, a source ranking may be and/or correspond to the number of valid data units of the source storage page that have not yet been assigned or mapped to a destination source page. A destination ranking may be and/or correspond to the number of storage units of the destination storage page that are available to be mapped to a data unit. Initially, each of the destination storage pages may be assigned a maximum destination ranking.

At block 2706, the ranking list generation and update module may generate source and destination lists. Each of the source lists may be associated with one of the source rankings, and the ranking list generation and update module may populate the source and destination ranking lists with corresponding source entries and destination entries, respectively. Each entry may correspond to one of source or destination storage pages. In addition, for some example methods, some of the source ranking lists may be divided into a single plane portion and a multi-plane portion. Entries placed in these lists may be placed into either the single plane portion or the multi-plane portion based on whether its corresponding source storage page has valid data units located in only a single plane or across both planes.

At block 2708, a mapping generation module may perform an initial stage of a mapping scheme to generate the source-to-destination mapping for the copy or folding operation. During the initial stage, the mapping generation module may map data units stored in source storage pages to destination storage pages on a page-by-page basis, starting with data units stored in source storage pages assigned to the maximum source ranking and moving in descending order or ranking. In addition, for each mapping made during the initial stage, the mapping generation module may assign the OCC method of copy identify that the data unit associated with the mapping is to be copied to the associated destination storage page using OCC. The mapping generation module may map data units to destination storage pages on a page by page basis until either there are no more source entries or no more destination entries available for mapping during the initial stage.

At block 2710, the ranking list generation and update module may update the source and destination ranking lists following the mapping performed during the initial stage. For some example methods, the source and destination ranking lists may be updated at the end of the initial stage. For other example methods, the source and destination ranking lists may be continually updated as mappings during the initial stage are made. Rankings for source and destination entries may be decremented, as previously described. Source entries corresponding to source storage pages that have no more unassigned valid data units (i.e., re-ranked to zero) may be removed from the source ranking lists. Similarly, destination entries corresponding to destination storage pages that have no more available storage units for mapping (i.e., re-ranked to zero) may be removed from the destination ranking lists.

At block 2712, after updating the ranking lists, if there are no more source entries in the source ranking lists or no more destination entries in the destination ranking lists, then mapping may be complete and at block 2714, the mapping generation module may send the completed source-to-destination mapping to a copy module to copy the valid data units to their mapped locations in the destination storage pages.

Alternatively, at block 2712, if source entries and destination entries remain, then at block 2716, the mapping generation module may perform a second stage of the mapping scheme. During the second stage, the mapping generation module may scan through each of the remaining destination entries, and for each of the corresponding destination storage pages, the mapping generation module may map data units of a source storage page to the destination storage page when the source storage page has a source ranking that matches a destination ranking of the destination storage page. In addition, for each mapping made during the second stage, the mapping generation module may assign the CTC or the OCC method of copy to identify that the data unit associated with the mapping is to be copied to the associated destination storage page using the assigned method. CTC may be the default copy method assigned for mappings made during the second stage. However, for example methods that place some source entries into single plane or multi-plane sections of the source ranking lists, the mapping generation module may look to the single plane sections first and in addition to identifying a mapping, determine whether OCC rather than CTC may be used to copy the data unit.

At block 2718, the ranking list generation and update module may update the source and destination ranking lists based on the mapping performed during the second stage. For some example methods, the source and destination ranking lists may be updated at the end of the second stage. For other example methods, the source and destination ranking lists may be continually updated as mappings during the second stage are made. At block 2720, if no more source entries or no more destination entries remain after the update, then the source-to-destination mapping may be complete and the mapping generation module may send the completed mapping to the copy module at block 2714.

Alternatively, at block 2720, if source entries and destination entries do remain, then the mapping generation module may perform a third mapping stage of the mapping scheme at block 2722. During the third stage at block 2722, the mapping generation module may map data units of highest ranked source storage pages to highest ranked destination storage pages, starting with the highest ranked source and destination storage pages and moving in descending order of ranking. In addition, for each mapping made during the third stage, the mapping generation module may assign the CTC or the OCC method of copy identify that the data unit associated with the mapping is to be copied to the associated destination storage page using the assigned method. CTC may be the default copy method assigned for mappings made during the third stage. However, for example methods that place some source entries into single plane or multi-plane sections of the source ranking lists, the mapping generation module may look to the single plane sections first and in addition to identifying a mapping, determine whether OCC rather than CTC may be used to copy the data unit.

At block 2724, the ranking list generation and update module may update the source and destination ranking lists following the mapping performed during the third stage. For some example methods, the source and destination ranking lists may be updated at the end of the third stage. For other example methods, the source and destination ranking lists may be continually updated as mappings during the third stage are made. At block 2726, if no source entries or no destination entries remain after the update, then the source-to-destination mapping may be completed and the mapping generation module may send the completed mapping to the copy module at block 2714. Alternatively, if source entries and destination entries remain at block 2726, then the method may proceed back to block 2724, where the mapping generation module may perform further mapping under the third stage. As previously described, mapping under the third stage and subsequent updates of the source and destination ranking lists may continue until either the source ranking lists or the destination ranking lists have no more entries.

One of skill in the art will recognize that exemplary embodiments are not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the claimed invention has been described in considerable detail with reference to certain embodiments thereof, other versions are possible. Therefore, the spirit and scope of the appended claims should not be limited to the description of the embodiments contained herein.

We claim:

1. An apparatus comprising:
   a memory comprising a plurality of source storage pages and a plurality of destination storage pages; and
   control circuitry in communication with the memory, the control circuitry configured to:
   rank the plurality of source storage pages based on numbers of valid data units stored in the plurality of source storage pages;
   assign a plurality of source rankings to the plurality of source storage pages based on the ranking, the source rankings indicate the numbers of valid data units stored in the plurality of source storage pages; and
   map valid data units stored in the plurality of source storage pages to the plurality of destination storage pages according to the source rankings assigned to the plurality of source storage pages.

2. The apparatus of claim 1, wherein the control circuitry is further configured to:
   generate a source-to-destination mapping that maps the valid data units to the plurality of destination storage pages based on the ranking.

3. The apparatus of claim 1, wherein the control circuitry is further configured to:
   select a number of highest-ranked source storage pages; and
   wherein, in order to map the valid data units, the control circuitry is configured to perform a first stage of mapping that maps valid data units stored in the selected number of highest-ranking source storage pages to the destination storage pages.

4. The apparatus of claim 3, wherein the control circuitry is further configured to:
   assign a plurality of destination rankings to the plurality of destination storage pages, wherein each destination ranking of the plurality of destination rankings indicates a number of unmapped storage units of a respective destination storage page; and
   update the plurality of source rankings assigned to the plurality of source storage pages and the plurality of destination rankings assigned to the plurality of destination storage pages based on the first stage of mapping, wherein the update identifies remaining unmapped valid data units and unmapped destination storage units.

5. The apparatus of claim 4, wherein the control circuitry is further configured to:
   in response to the update of the source rankings and the plurality of destination rankings, perform a second stage of mapping that maps remaining unmapped valid data units to the plurality of destination storage pages based on matches between the plurality of source rankings and the plurality of destination rankings.

6. The apparatus of claim 5, wherein the control circuitry is further configured to:
   further update the plurality of source rankings assigned to the plurality of source storage pages and the plurality of destination rankings assigned to the plurality of destination storage pages based on the second stage of mapping, wherein the further update identifies further remaining unmapped valid data units and unmapped destination storage units; and
   in response to the further update of the source rankings and the plurality of destination rankings, perform a third stage of mapping that maps still remaining unmapped valid data units to the plurality of destination storage pages based on remaining highest-ranked source storage pages and remaining highest-ranked destination rankings.

7. The apparatus of claim 3, wherein the control circuitry is further configure to identify that the valid data units mapped during the first stage of mapping are each to be copied using an on-chip copy operation.

8. The apparatus of claim 1, wherein the control circuitry is further configured to, for source storage pages with the same source ranking, map valid data units stored in source storage pages storing valid data units in only one of the multiple planes before mapping valid data units stored in storage pages storing valid data units in the multiple planes.

9. The apparatus of claim 1, wherein the control circuitry is further configured to copy the valid data units to the plurality of destination pages according to the mapping.

10. The apparatus of claim 1, wherein the plurality of source storage pages have a lower bit-per-cell density than the plurality of destination storage pages.

11. The apparatus of claim 1, wherein the control circuitry is further configured to:

generate a plurality source ranking lists, each of the source ranking lists being associated with a different one of the plurality of source rankings; and initially populate the plurality of source ranking lists with source entries corresponding to the plurality of source storage pages, the plurality of source ranking lists initially populated with the source entries based on the ranking of the plurality of source storage pages.

12. An apparatus comprising:

a memory comprising a plurality of source storage pages and a plurality of destination storage pages, the plurality of source storage pages storing a first set of valid data units and a second set of valid data units; and control circuitry in communication with the memory, the control circuitry configured to:

determine a set of source storage pages of the plurality of source storage pages based on a criterion for data stored in the plurality of source storage pages, wherein the criterion comprises a highest number of valid data units stored among the plurality of source storage pages; and map valid data units stored in the set of source storage pages to a set of destination storage pages of the plurality of destination pages, wherein the mapping corresponds to an on-chip-copy operation for each of the valid data units stored in the set.

13. The apparatus of claim 12, wherein the set of source storage pages comprises a first set of source storage pages and the set of destination storage pages comprises a first set of destination storage pages, and wherein the control circuitry is further configured to:

determine a second set of source storage pages of the plurality of source storage pages based on a matching of source rankings of the second set of source storage pages to destination rankings of a second set of destination storage pages; and map valid data units stored in the second set of source storage pages to the second set of destination storage pages.

14. The apparatus of claim 12, wherein the control circuitry is further configured to communicate with the memory to have each of the valid data units stored in the set of source storage pages copied to the set of destination storage pages via the on-chip copy operation.

15. An apparatus comprising:

a memory; and control circuitry configured to:

rank a plurality of source locations and a plurality of destination locations of the memory, the ranking of the plurality of source locations being based on storage of valid data units and the ranking of the plurality of destination locations being based on storage availability;

map a first set of valid data units to the plurality of destination locations based on the ranking;

after the mapping of the first set, re-rank the plurality of source locations based on the storage of valid data units and the plurality of destination locations based on the storage availability; and map a second set of valid data units to the plurality of destination locations based on the re-ranking.

16. The apparatus of claim 15, wherein the control circuitry is further configured to select a number of highest-ranked source locations, wherein the first set of valid data units are stored in the number of highest-ranked source locations.

17. The apparatus of claim 15, wherein the control circuitry is further configured to:

after re-ranking the plurality of source locations and the plurality of destination locations, match the plurality of source locations to the plurality of destination locations based on the re-ranking, wherein mapping the second set of valid data units to the plurality of destination locations is based on the matching.

18. The apparatus of claim 15, wherein the memory is configured to copy each of the valid data units of the first set to the plurality of destination locations using an on-chip operation.

* * * * *